United States Patent [19]

Okazaki et al.

[11] Patent Number: 5,159,637
[45] Date of Patent: Oct. 27, 1992

[54] SPEECH WORD RECOGNIZING APPARATUS USING INFORMATION INDICATIVE OF THE RELATIVE SIGNIFICANCE OF SPEECH FEATURES

[75] Inventors: Makoto Okazaki, Yokohama; Koji Eto, Kumamoto, both of Japan

[73] Assignee: Fujitsu Limited, Kawasaki, Japan

[21] Appl. No.: 821,861

[22] Filed: Jan. 16, 1992

Related U.S. Application Data

[63] Continuation of Ser. No. 385,577, Jul. 27, 1989, abandoned.

[30] Foreign Application Priority Data

Jul. 27, 1988 [JP] Japan ................... 63-185537
Sep. 13, 1988 [JP] Japan ................... 63-227584
Sep. 14, 1988 [JP] Japan ................... 63-228350

[51] Int. Cl.⁵ .............................. G10L 3/00
[52] U.S. Cl. .......................... 381/43; 381/41
[58] Field of Search ................ 381/41-45; 395/2

[56] References Cited

U.S. PATENT DOCUMENTS

| | | | |
|---|---|---|---|
| 4,489,435 | 12/1984 | Moshier | 381/43 |
| 4,596,031 | 6/1986 | Hakaridani et al. | 381/43 |
| 4,651,289 | 3/1987 | Maeda et al. | 364/513.5 |
| 4,677,672 | 6/1987 | Ukita et al. | 364/513.5 |
| 4,712,243 | 12/1987 | Ninomiya et al. | 381/43 |
| 4,715,004 | 12/1987 | Kabasawa et al. | 381/43 |
| 4,720,863 | 1/1988 | Li et al. | 381/42 |
| 4,876,720 | 10/1989 | Kaneko et al. | 381/43 |

Primary Examiner—Michael R. Fleming
Assistant Examiner—Michelle Doerrler
Attorney, Agent, or Firm—Staas & Halsey

[57] ABSTRACT

An isolated speech word recognizer for recognizing an input pattern as one of a plurality of known patterns, comprising a similarity information storing unit for storing similarity information representing the degree of significance of a feature in each of the known patterns for recognizing thereof, and a most similar pattern determining unit for determining one of the plurality of known patterns as the most similar pattern to the input pattern by the use of the similarity information, whereby the recognition performance is improved.

18 Claims, 20 Drawing Sheets

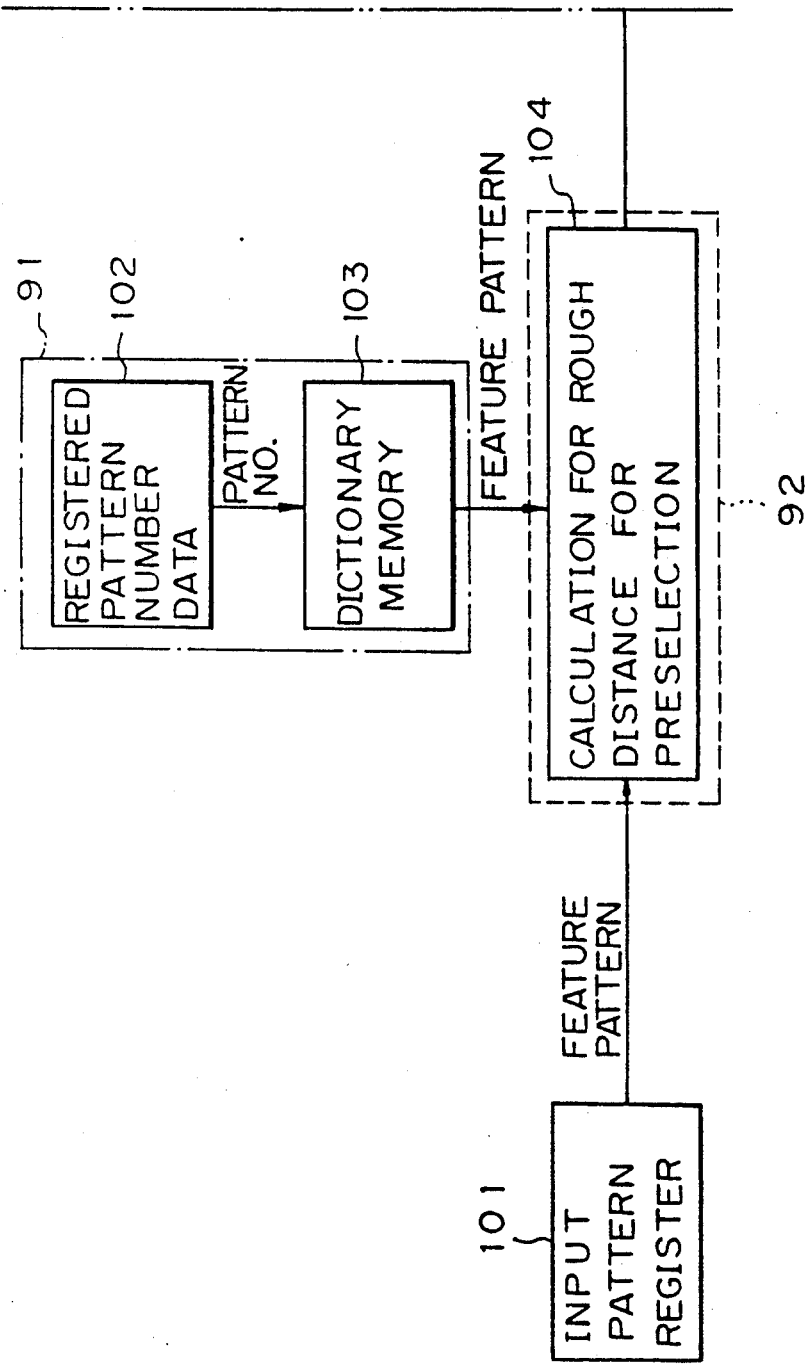

SPEECH WORD RECOGNIZING APPARATUS USING INFORMATION INDICATIVE OF THE RELATIVE SIGNIFICANCE OF SPEECH FEATURES

This application is a continuation of application Ser. No. 07/385,577, filed Jul. 27, 1989, now abandoned.

BACKGROUND OF THE INVENTION (1) Field of The Invention

The present invention relates to an isolated word recognizer (also referred to as a speech recognizer) for determining similarities between a pattern of an input speech signal and a plurality of reference patterns, and for outputting one of the reference patterns which has the nearest similarity as a result of recognition.

In recent speech recognizers, speech recognition processing techniques have been established and the utility thereof has been realized in various fields. As a result, the circuits necessary for the speech recognition processing have been made as large scale integrated circuits (LSI). In various types of such speech recognizers using LSIs, a development of an apparatus used as a man-machine interface (MMI) having an input of human speech has especially been actively developed. As examples of man-machine interface, there are telephone number input, or command input when program is to be prepared. To use the speech recognizer as a man-machine interface, the speech recognizer must satisfy the requirements of small size, low cost, high performance, and the like. The speech signals, however, fluctuate even when they are comprised of the same words. The fluctuations are caused by the difference of the voice when speakers are different, the feeling of the speaker, the circumstances of the speaker and the like. Therefore, the speech signals input to the speech signal recognizer are not always constant even when the speech signals are for the same word. In such a case, it is necessary to avoid errors in recognition.

(2) Description of the Related Art

In a conventional speech signal recognition processing sequence, features are extracted from the input speech signal, a pattern based on the extracted features is compared with a plurality of reference patterns, and a reference pattern which is most similar to the pattern based on the input speech signal is output as a recognition result. The shorter the distance between an input pattern and a reference pattern is, the higher the degree of similarity therebetween. The input feature extraction is described in the prior application Japanese Patent Application No. 62-33852 filed on Dec. 24, 1987. The corresponding U.S. patent application is Ser. No. 287,284, filed on Dec. 21, 1988.

In the above-described conventional speech recognizer, a weight coefficient 1 is multiplied by each difference between the feature parameters of an input pattern and its reference patterns. Therefore, all of the differences of the feature parameters are weighted by the same weight coefficient 1. In other words, conventionally, the feature parameters are not weighted. In the condition in which the same weight coefficient is applied, assuming that a numeral "ichi (1)" is to be recognized. In this case, the input pattern is compared with reference patterns. The distance between the input pattern of "ichi (1)" and the reference pattern of "ichi (1)", however, is very similar to the difference between the input pattern of "ichi (1)" and the reference pattern of "hachi(8)" because the part "chi" in the reference pattern of "ichi (1)" and the reference pattern of "hachi(8)" are the same, and because there is only a difference in the part "i" of the reference pattern of "ichi (1)" and the part "ha" in the reference part "hachi(8)". Therefore, when the input speech fluctuates, it is difficult to correctly recognize the input spoken word.

From another point of view, to attain high performance of the input speech recognition, a multi-template method has been provided before the present invention. In the multi-template method, a plurality of voices are used for one word, and a plurality of feature patterns corresponding to the plurality of voices are formed and registered. Namely, for the same word, for example "ichi (1)", feature patterns of both a short pronounciation [it] and a long pronounciation [i: t] are formed and registered. By this, the possibility of error in recognition due to a fluctuation of the input speech at the time of recognition can be decreased.

This multi-template registering method, however, has a disadvantage in that a large number of calculations of distances are required between the feature patterns formed by an input speech and the feature patterns read from a dictionary at the time of recognition, because there are a plurality of feature patterns formed for one input word, so that the number of feature patterns registered in the speech dictionary is too large.

To answer with a good response time, it is necessary to calculate at high speed. If, however, the number of calculations is increased, a good response time becomes impossible, and the small size and low cost cannot be realized.

SUMMARY OF THE INVENTION

Accordingly, an object of the present invention is to provide an isolated speech recognizer in which error recognition due to the fluctuations of the input speech and the like is decreased and the recognition performance is improved.

To attain the above object, there is provided, according to the present invention, an isolated speech word recognizer for recognizing an input pattern as one of a plurality of known patterns, comprising: a similarity information storing unit for storing similarity information representing the degree of significance of a feature in each of the known patterns for recognizing thereof; and a most similar pattern determining unit, operatively connected to the similarity information storing unit, for determining one of the plurality of known patterns as the most similar to the input pattern by the use of the similarity information.

The similarity information is a plurality of weight patterns respectively corresponding to the plurarity of reference patterns, each of the weight patterns representing the degree of significance to recognize the corresponding one of the known patterns.

The isolated speech word recognizer further comprises: a feature parameter extracting unit, operatively connected to the most similar pattern determining unit, for extracting a plurality of input feature parameters from the input pattern; and a reference pattern storing unit, operatively connected to the most similar pattern determining unit, for storing a plurality of reference patterns as the known patterns each having a plurality of reference feature parameters. The weight pattern of each of the reference patterns has a plurality of weight parameters corresponding to the plurality of reference feature parameters in each of the plurality of reference patterns. Each of the weight parameters is smaller than a predetermined value when the corresponding reference feature parameter is relatively significant to recognize the corresponding reference pattern, and is larger than the predetermined value when the corresponding reference feature parameter is not relatively significant to recognize the corresponding reference pattern.

The most similar pattern determining unit comprises: a distance calculating unit for calculating distances between the input pattern and the plurality of reference patterns; and a multiplying unit for multiplying the calculated distances by the corresponding weight patterns to obtain weighted distances. The most similar pattern determining unit determines one of the plurality of reference patterns as the most similar to the input pattern by determining the shortest distance in the weighted distances.

Each of the weighted distances is the sum of weighted differences, each of the weighted differences is obtained by multiplying the difference between an input feature parameter and the corresponding reference parameter by the corresponding weight parameter.

Alternatively, each of the weighted distances is the sum of the differences between the weighted input feature parameters and the weighted reference parameters. Each of the weighted input feature parameters is obtained by multiplying an input feature parameter by the corresponding weight parameter. And each of the weighted reference parameter is obtained by multiplying a reference feature parameter by the corresponding weight parameter.

The weight patterns are formed from standard deviations of the known patterns.

Each of the parameters in the input feature parameters, in the reference feature parameters, and in the weight parameters is a function of frequency with respect to time.

Alternatively, the similarity information is a plurality of similarity functions respectively corresponding to the plurality of known patterns. Each of the similarity functions being obtained as a histogram of predetermined number of times of pronounciations of the corresponding known pattern. In this case, the similar information storing unit is a similarity function group storing unit, operatively connected to the most similar pattern determining means, for storing a plurality of similarity function groups. Each of the similarity function groups includes a plurality of similarity functions each representing a normalized histogram with respect to feature parameters corresponding to one of the known patterns. The most similar pattern determining unit calculates similarities by the use of the input feature parameters and the similarity function groups, whereby the known pattern which represents the maximum similarity to the input pattern is recognized as the most similar pattern to the input pattern.

The isolated speech word recognizer may further comprise a preselecting feature pattern storing unit for previously storing a group consisting of a plurality of preselecting feature patterns corresponding to a speech content; a distance calculating unit, operatively connected to the preselecting feature pattern storing unit, for calculating distances between an input feature pattern formed from an input speech content and the preselecting feature patterns stored in the preselecting feature pattern storing means; a distance data temporary storing unit, operatively connected to the distance calculating unit, for temporarily storing the distances calculated by the distance calculating unit; a preselecting unit, operatively connected to said distance calculating unit, for selectively outputting the preselecting feature pattern representing the minimum distance in the distances stored in the distance data temporary storing means; and a link data storing unit, operatively connected to the preselecting unit and the distance data temporary storing unit, for previously storing a relation between a feature pattern and a group in which the feature pattern is included, all feature patterns in the group in which the selectively output preselecting feature pattern is included being output from the link data storing unit and input to the distance data temporary storing unit, whereby, from the distance data temporary storing unit, the distance data corresponding to all of the feature patterns in the group in which the selectively output preselecting feature pattern belongs are deleted.

The link data storing unit comprises a link data memory unit for storing the relation, the relation being the one between a pattern number of a feature pattern and a speech number of a group in which the feature pattern is included; a comparing unit, operatively connected to the preselecting unit and the link data memory unit, for reading, from the link data memory unit, one or more speech numbers corresponding to the pattern number of the preselecting feature pattern output from the preselecting unit; and a recomparing unit, operatively connected to said comparing unit, the link data memory unit, and the distance data temporary storing unit, for reading, from the link data memory unit, one or more pattern numbers corresponding to the speech number output from the comparing unit, whereby, in the distance data temporary storing unit, the distance data corresponding to the speech number output from the recomparing unit is deleted.

BRIEF DESCRIPTION OF THE DRAWINGS

The above object and features of the present invention will be more apparent from the following description of the preferred embodiments with reference to the accompanying drawings, wherein:

FIGS. 10A and 10B are block diagrams showing in detail the second embodiment of the present invention;

FIG. 10 shows how FIGS. 10A and 10B connect.

DESCRIPTION OF THE PREFERRED EMBODIMENTS

For better understanding of the present invention, a conventional speech recognizer and problems therein will first be described with reference to FIGS. 1 to 4.

Figure 1:
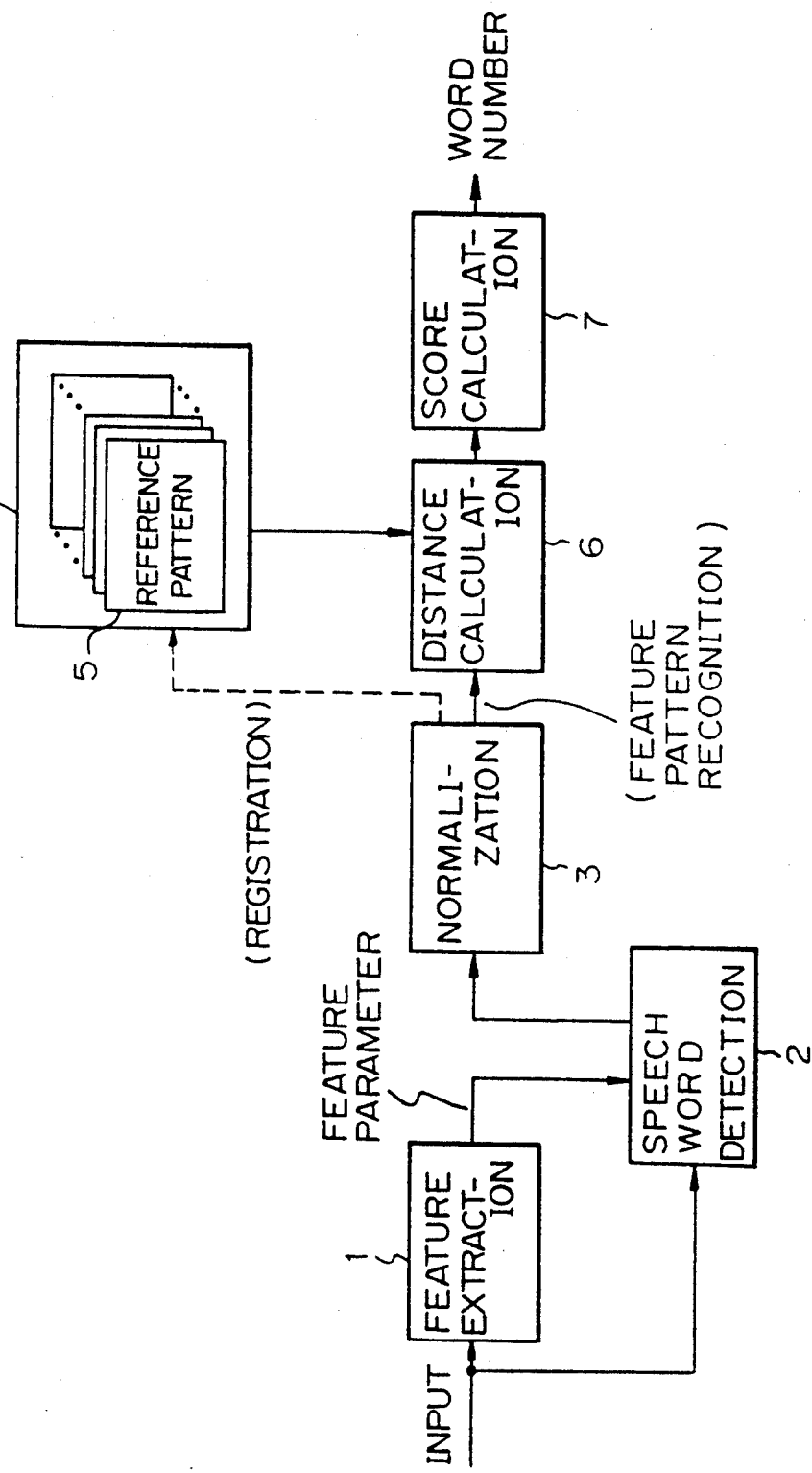
FIG. 1 is a block diagram showing an example of a conventional isolated word recognizer.
Figure 2:
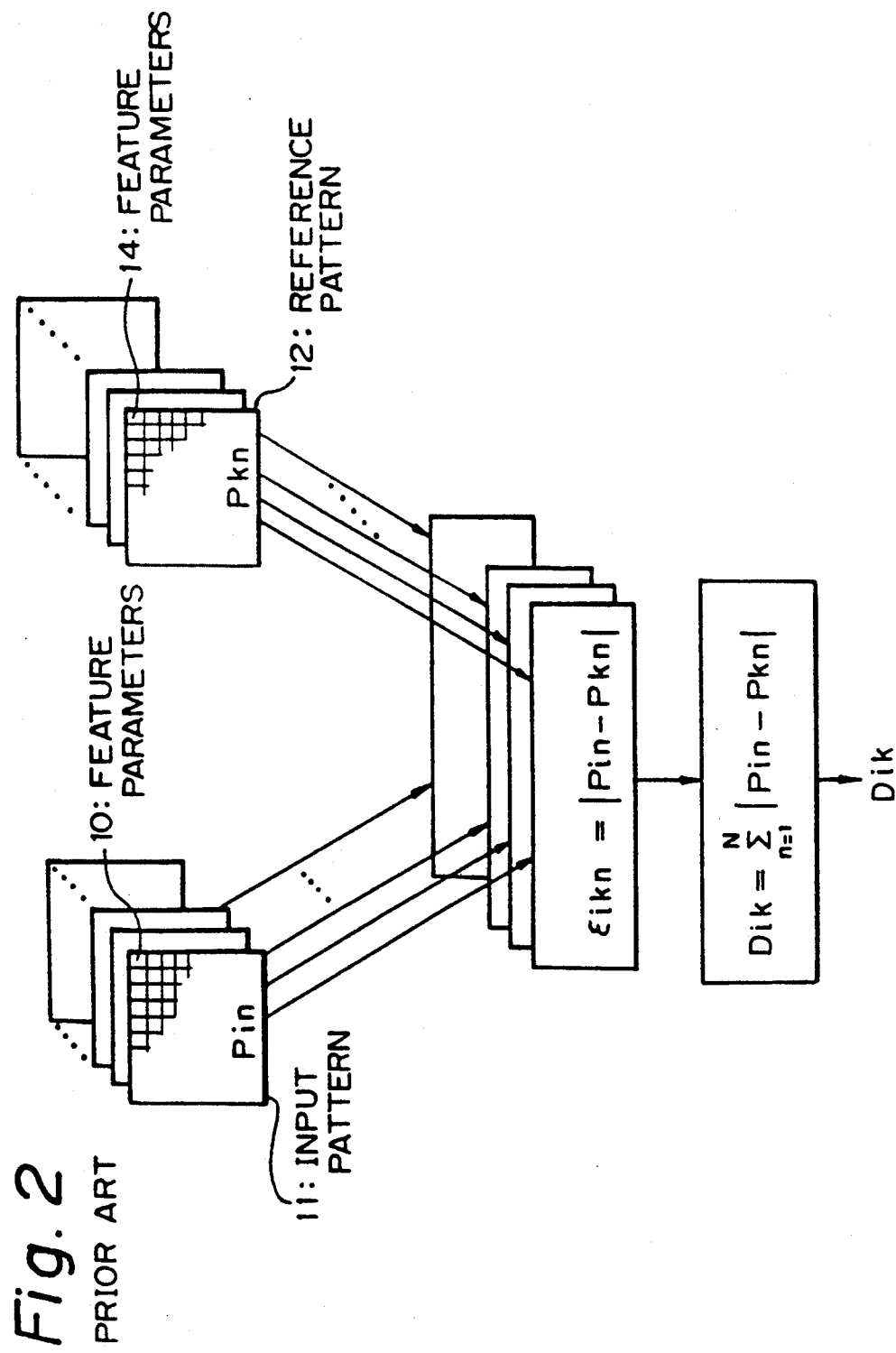
FIG. 2 is a diagram explaining the calculation of the distances in a conventional distance calculating part.

FIG. 1 is a block diagram showing an example of a conventional speech recognizer, and FIG. 2 is a diagram for explaining the calculation of distances in the conventional distance calculation.

In the figures, an input speech word is input to a feature extracting part 1 by which the features of the input speech are extracted by means of a filter bank consisting of a plurality of bandpass filters (BPF) or by means of analysis using linear predictive coding (LPC). In an isolated speech word detecting part 2, the beginning and the end of the spoken word are detected based on the power of the input speech signal, and the feature parameters 10 detected during the time between the beginning and the end are stored therein. In the feature extracting part 1, when a filter bank is used, the feature parameters 10 have frequency components with respect to time. The lengths of the times from the beginnings to the ends depend on the input speech words. Therefore, the length of time for each input speech word is normalized to be a predetermined time by a normalization part 3. The normalized pattern of the feature parameter 10 is an input parameter 11. In a dictionary memory 4, a plurality of reference patterns 5 corresponding to respective speech words are previously registered. At the time of recognition of an input speech word, the input pattern 11 is sent to a distance calculating part 6 wherein the input pattern 11 is compared with the reference patterns 12.

The calculating procedure in the distance calculating part 6 will be described with reference to FIG. 2.

First, a difference $\epsilon_{ikn}$ between the feature parameter 10 of the input pattern 11 and the corresponding feature parameter 14 of the reference pattern 12 is obtained. Assume that the n-th feature parameter 10 in the input pattern 11 is $P_{in}$, and the n-th feature parameter 14 in the k-th reference pattern 12 in a plurality of reference patterns is $P_{kn}$, then the $\epsilon_{ikn}$ is expressed as:

$$\epsilon_{ikn} = |P_{in} - P_{kn}|$$

Also, the distance $D_{ik}$ between the input pattern 11 and the k-th reference pattern 12 is expressed as:

$$D_{ik} = \sum_{n=1}^{N} |P_{in} - P_{kn}|$$

where N is the number of the feature parameters 10 in the input pattern 11 or the number of the feature parameters 14 in the k-th reference pattern 12. Namely, the distance $D_{ik}$ is the sum of the differences $\epsilon_{ikn}$ for all of the feature parameters 10, 14 of the input pattern and the k-th reference pattern. Similar calculations are effected for all of the 1 to k reference patterns 12.

The distances between the input pattern 11 and the reference patterns 12 thus obtained in the distance calculating part 6 are sent to a tally calculating part 70 (also referred to as score calculation part) wherein one reference pattern 12 which gives the shortest distance is determined. Then, when a speech word is to be recognized, the word number corresponding to the reference pattern determined as above is output as a recognized result.

In the above-described conventional speech recognizer, the feature parameters are not weighted. Therefore, when the input speech fluctuates, it is difficult to correctly recognize the input speech word as described before.

As one of the methods to solve the problems in the conventional speech recognizer shown in FIG. 1, a preselection system is known. In the conventional preselection system, only particular parameters in the feature patterns stored in the dictionary 4 are used to determine a tentative distance, and then by the use of the tentative distance, a preselection of a small number of feature patterns is effected, and matching is effected from the preselected patterns.

Figure 3:
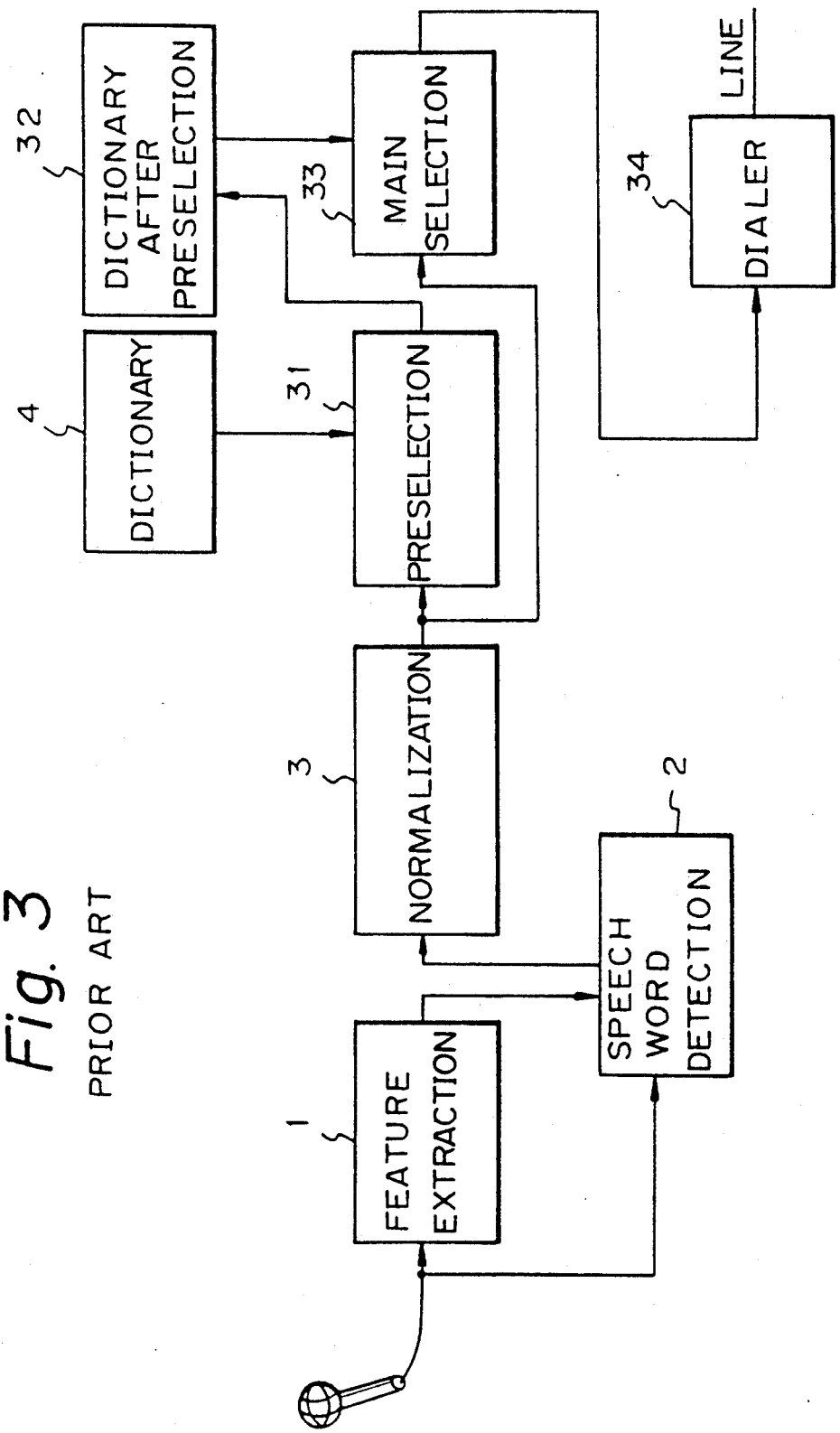
FIG. 3 is a block diagram showing another example of a conventional isolated word recognizer.

FIG. 3 shows another example of a conventional speech recognizer in which the above-mentioned preselection is effected.

In the figure, the same reference numerals as in FIG. 3 represent the same parts. 31 is a preselection processing part, 32 a dictionary after preselection, 33 a main selection, and 34 a dialer.

Figure 4:
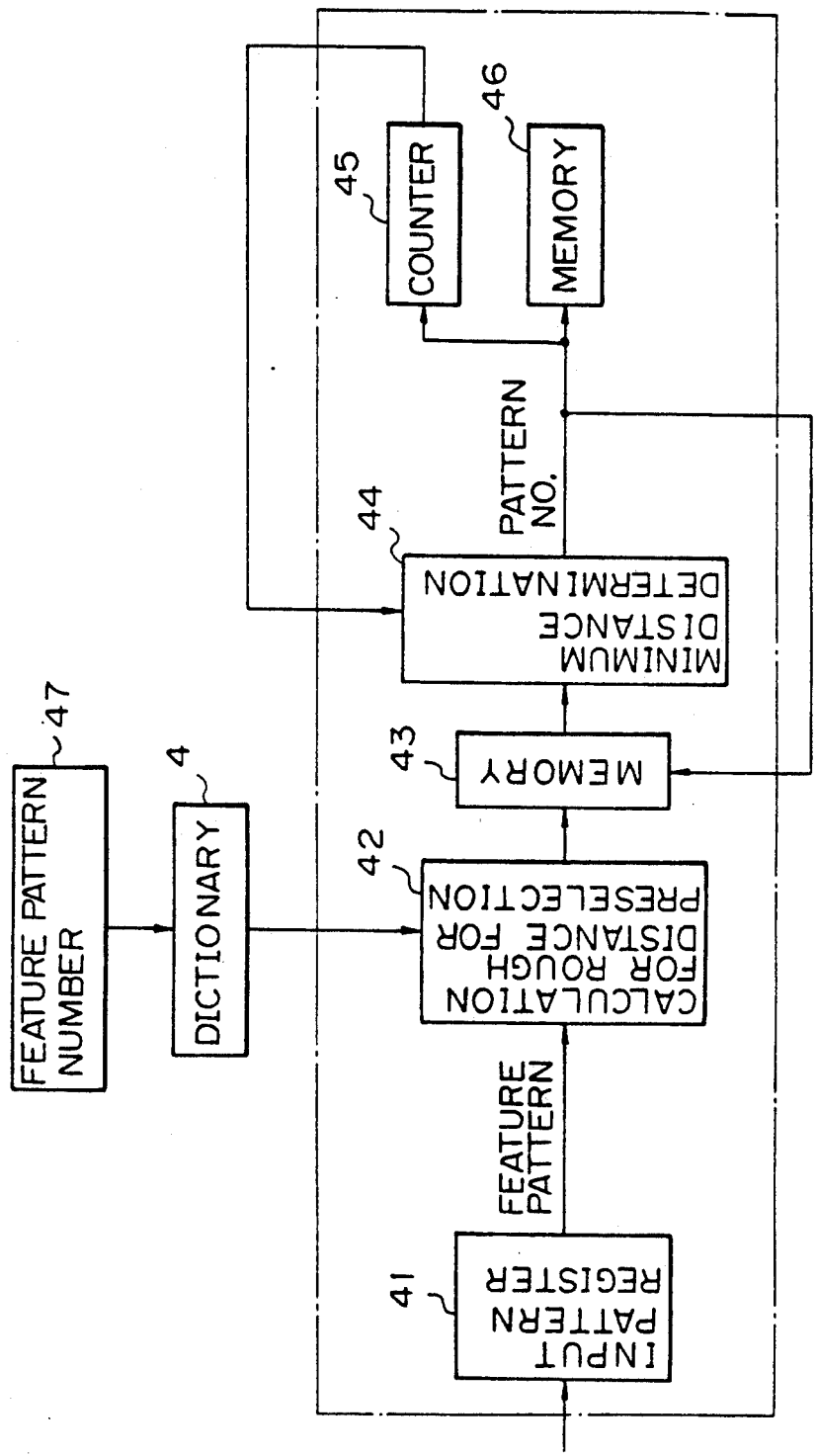
FIG. 4 is a block diagram showing still another example of a conventional isolated word recognizer.

FIG. 4 is a block diagram showing an example of a conventional preselection processing part 31. In the figure, an input pattern register part 41 outputs the feature patterns of the input speech signal. A tentative distance calculating part 42 for the preselection calculates the tentative distances by the use of the particular parameters of the feature pattern of the input pattern speech from the input register part 41 and the particular parameters in all of the feature parameters stored in the speech dictionary memory 4. By means of a memory 43 for temporarily storing the distance data, a minimum distance determining part 44, and a counter 45, the most significant N feature patterns are selected in the order from the smallest tentative distance. A registered pattern number data memory 47 connected to the dictionary memory 4 outputs pattern numbers. The pattern numbers obtained at the output of the minimum distance determining part 44 are fed back to the memory 43 for temporarily storing the distance data from which the distance data corresponding to the pattern numbers are deleted. When the counter 45 counts N times of the pattern numbers output from the minimum distance determining part 44, the counter 45 inhibits the part 44 from outputting a pattern number. The output signals from the minimum distance determining part 46 are stored as preselection results in a memory 46.

In the above-described conventional preselection system shown in FIG. 4, however, if there are, in the dictionary 4, a plurality of feature patterns corresponding to one input speech word, the plurality of the feature patterns are preselected in response to one speech word. Therefore, in this case, even when N feature patterns are preselected, the number of preselected patterns for one registered speech word is substantially smaller than N. As a result, there is a problem in that the preselection range is narrow.

The present invention provides an improved speech recognizer in which the above mentioned problems in the conventional speech recognizer are obviated.

Next, embodiments of the present invention will be described.

FIRST EMBODIMENT

Figure 5:
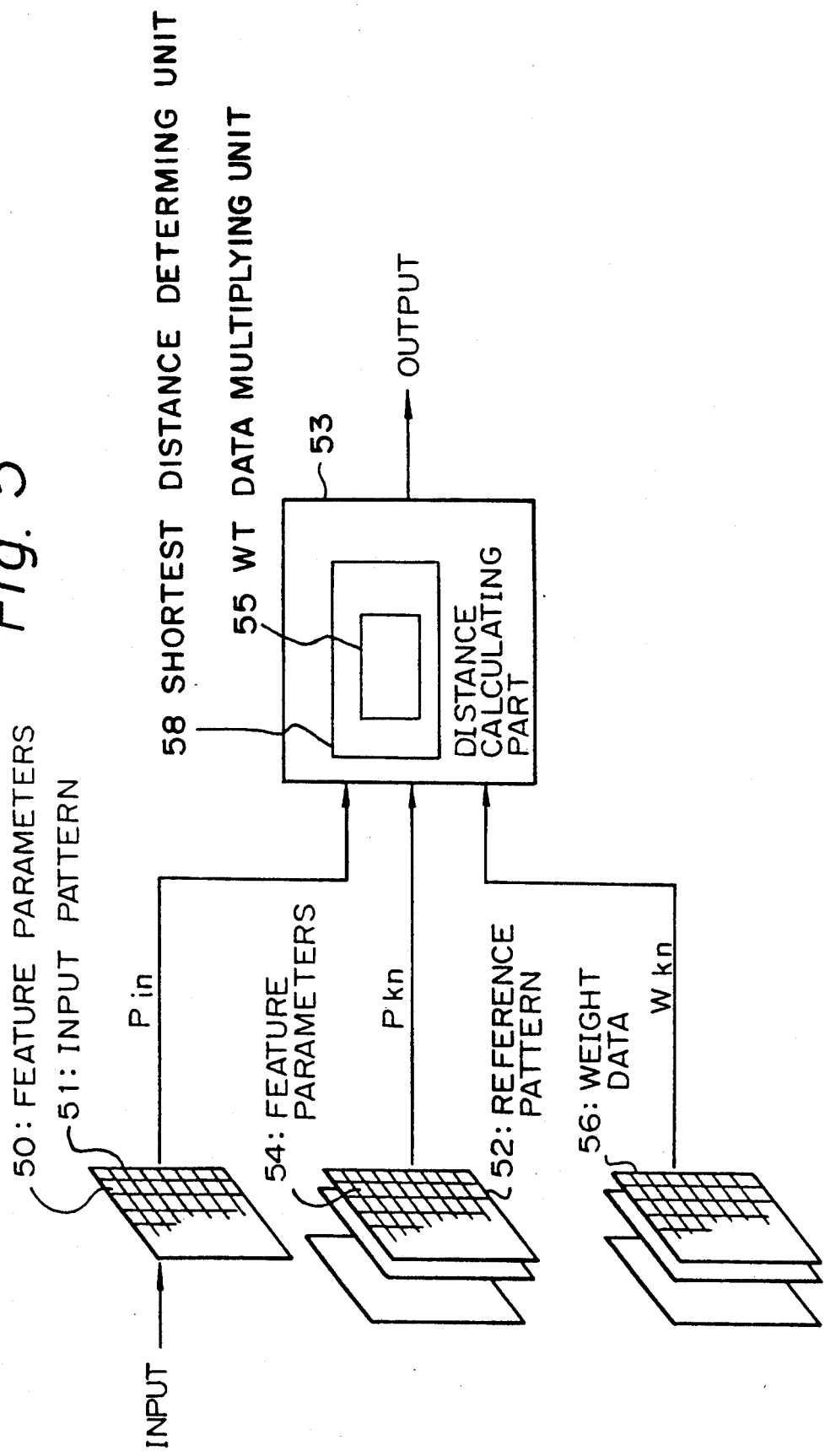
FIG. 5 is a diagram showing the principle of a first embodiment of the present invention.

FIG. 5 is a block diagram showing the principle of the first embodiment of the present invention. In the figure, an essential part of an isolated speech word recognizer for recognizing an input pattern 51 of a speech word to be the same as a reference pattern 52 according to the first embodiment of the present invention is illustrated. The speech recognizer comprises a distance calculating unit 53 for calculating distances between an input feature parameter $P_{in}$ extracted from an input speech signal and a plurality of reference patterns $P_{kn}$, and a shortest distance determining unit 58 in the distance calculating unit 53 for determining which one of the reference patterns corresponds to the shortest distance in the distances obtained by the distance calculating unit. The shortest distance determining unit 58 includes, according to the present invention, a weight data multipling unit 55 for multipling weight data 56 by the differences between the feature parameter 50 of the input pattern 51 and the feature parameters 54 of the reference patterns 52 before determining the reference pattern corresponding to the shortest distance. Alternatively, weight data 56 may be multiplied by both the feature parameter 50 of the input pattern 51 and the feature parameters 54 of the reference patterns 52 before determining the reference pattern corresponding to the shortest distance.

According to the first embodiment, the distance is determined after multiplying the feature parameter 50 of the input pattern 51 by the weight data 56, and multipling the feature parameters 54 by the weight data 56.

Figure 6:
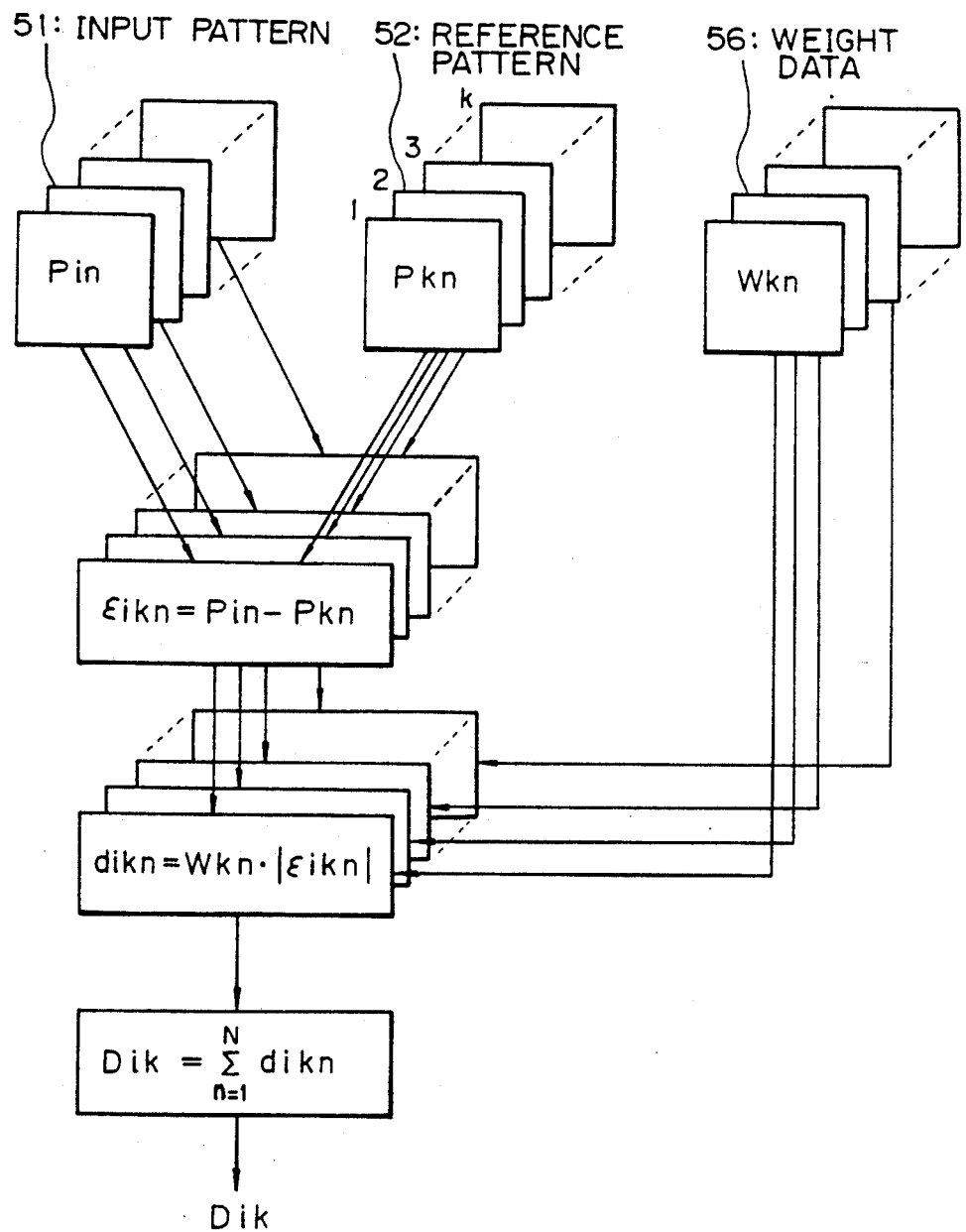
FIG. 6 is a diagram explaining the calculation of the distances in a distance calculating part in the first embodiment shown in FIG. 5.

FIG. 6 is a diagram explaining the calculation of the distances in the distance calculating unit 53 when the differences between the feature parameters of the input pattern and the feature parameters of the reference patterns are multiplied by the weight data.

The difference $\epsilon_{ikn}$ between a feature parameter ($P_i$) 51 and a feature parameter ($P_{kn}$) 54 is expressed as:

$$\epsilon_{ikn} = P_{in} - P_{kn}$$

The value $d_{ikn}$ obtained from the absolute value of the value $\epsilon_{ikn}$ multiplied by the weight data($W_{kn}$) 56 is expressed as:

$$d_{ikn} = W_{kn} \cdot |\epsilon_{ikn}|$$

Assume that the number of the feature parameters $P_{in}$ and $P_{kn}$ are respectively N. Then the distance $D_{ik}$ between the input pattern 51 and the reference pattern 52 is expressed as:

$$D_{ik} = \sum_{n=1}^{N} d_{ikn}$$

Here, if the n'-th feature parameter 54 ($P_{kn'}$) in the k-th reference pattern 52 among the plurality of the reference patterns is very important when the input pattern 51 is compared with the reference patterns, the weight data ($W_{kn'}$) 56 for the n'-th feature parameter $P_{kn'}$ in the reference patterns 52 is set to satisfy:

$$0 < W_{kn'} < 1$$

The closer to zero the weight data $W_{kn'}$ is, the more important the n'-th feature parameter is in comparison with the other feature parameters $P_{kn}$. The other weight data $W_{kn}$ (where n=n') is set as:

$$W_{kn} = 1$$

Assume that the distance between the input pattern 51 and the reference pattern 52 is $D_{ik}$. Then the distance $D'_{ik}$ between the input pattern 51 and the k-th reference pattern 52 is:

$$D_{ik}' = \sum_{n=1}^{n'-1} W_{kn} \cdot |\epsilon_{ikn}| + \sum_{n=n'+1}^{N} W_{kn} \cdot |\epsilon_{ikn}| + W_{kn'}|P_{in'} - P_{kn'}|$$
$$= D_{ik} - (1 - W'_{kkn'}) \cdot |\epsilon_{ikn'}|$$

Accordingly, the distance $D'_{ik}$ according to the present invention is smaller than the distance $D_{ik}$ with the same weight data. Since the distance between the important reference feature and the input feature is shorter than the conventional one, the recognition rate of the important feature pattern is improved.

When the n'-th feature parameter 54 ($P_{kn'}$) in the reference pattern 52 is not important, the weight data $W_{kn'}$ corresponding to the feature parameter $P_{kn'}$ is set to satisfy:

$$1 < W_{kn'}$$

Thereby, the n'-th feature parameter $P_{kn'}$ can be made to be less important than the other feature parameters 54. Assuming that, when the weight data $W_{kn'}$ is set as above, the distance is $D'_{ik}$ and the weight data is $W_{kn'}$. Then the relation between the distance $D'_{ik}$ with the weight data and the distance $D_{ik}$ with the same weight data is:

$$D'_{ik} > D_{ik}$$

Accordingly, the distance $D'_{ik}$ in this case is longer than the distance $D_{ik}$ with the same weight data. Since the distance between the less important reference feature and the input feature is longer than the conventional one, the recognition rate of the normal feature pattern is improved.

Alternatively, both the feature parameters 54 of the reference pattern 52 and the feature pattern 50 of the input pattern 51 may be multiplied by the weight data 56, according to the present invention. In this case also, the distance between the reference pattern 52 and the input pattern 51 with the weight data results in reduced error recognition.

A more detailed description will be given with reference to FIG. 7, wherein 70 is a microphone, 71 an A/D converter, 72 a pre-processor, 73 a feature extracting part. 74 is a main processor including a speech interval detecting part 75, a memory 76, a normalization part 77, a distance calculating part 78, and tally (i.e., score) calculating part 79. 80 is a dictionary memory for storing the reference patterns 52, 56 weight patterns provided to correspond to the reference patterns 52, 81 a dictionary memory for storing weight data 56, and 82 a dialer.

Figure 7:
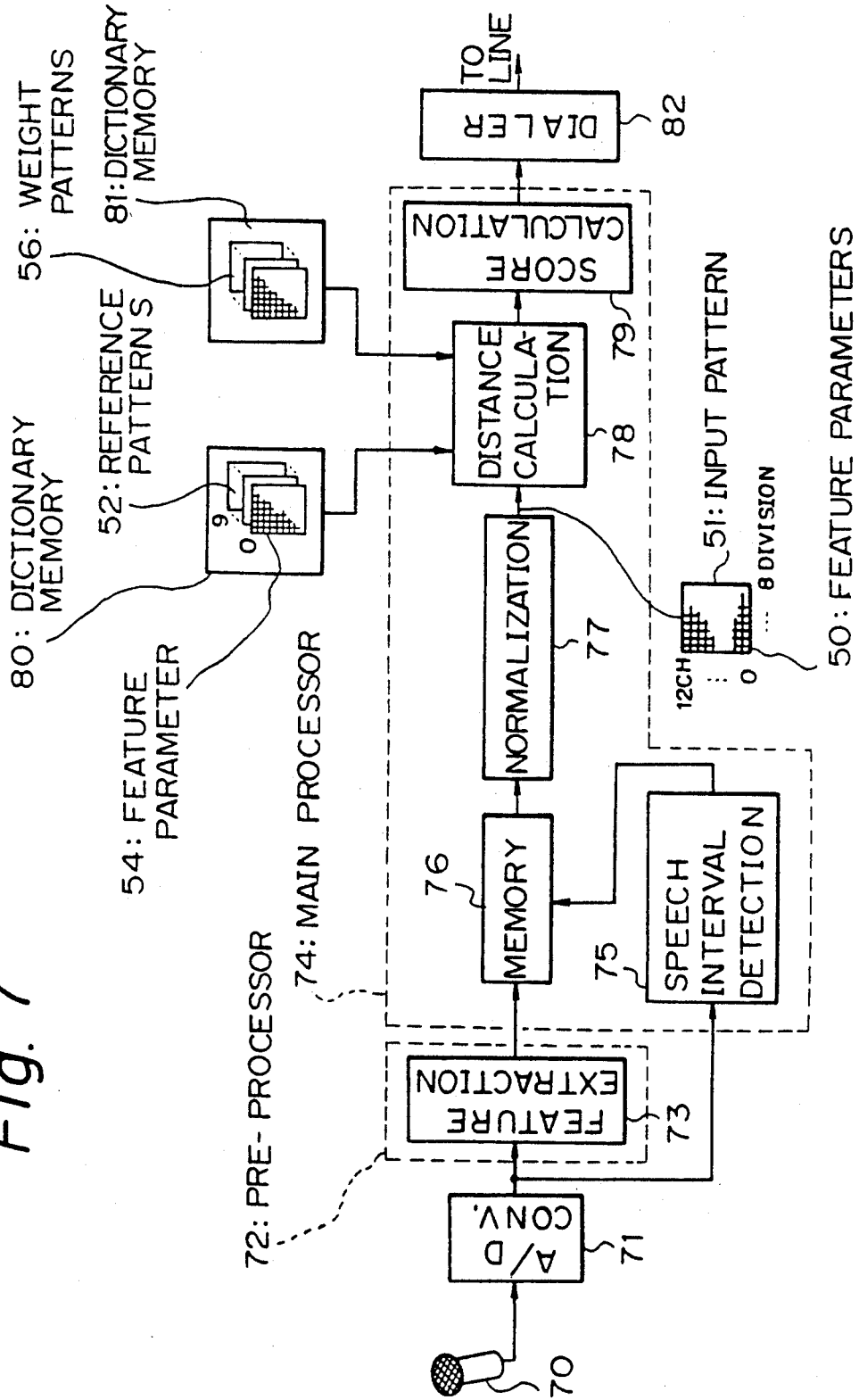
FIG. 7 is a block diagram showing in detail the first embodiment of the present invention.

The example shown in FIG. 7 is a speech recognizer for recognizing ten numeric words for automatic dialing.

Speech sound generated by a person is converted by the microphone 70 into an electric signal and is sent to the A/D converter 71. The digitized speech signal from the A/D converter 71 is sent to both the feature extracting part 73 and the speech interval detecting part 75. In the speech interval detecting part 75, the beginning and the end of the speech sound are detected by discriminating the level of the speech sound. Within the detected time interval between the beginning and the end, feature parameters 50 from the feature extracting part 73 are stored in the memory 76.

Figure 8:
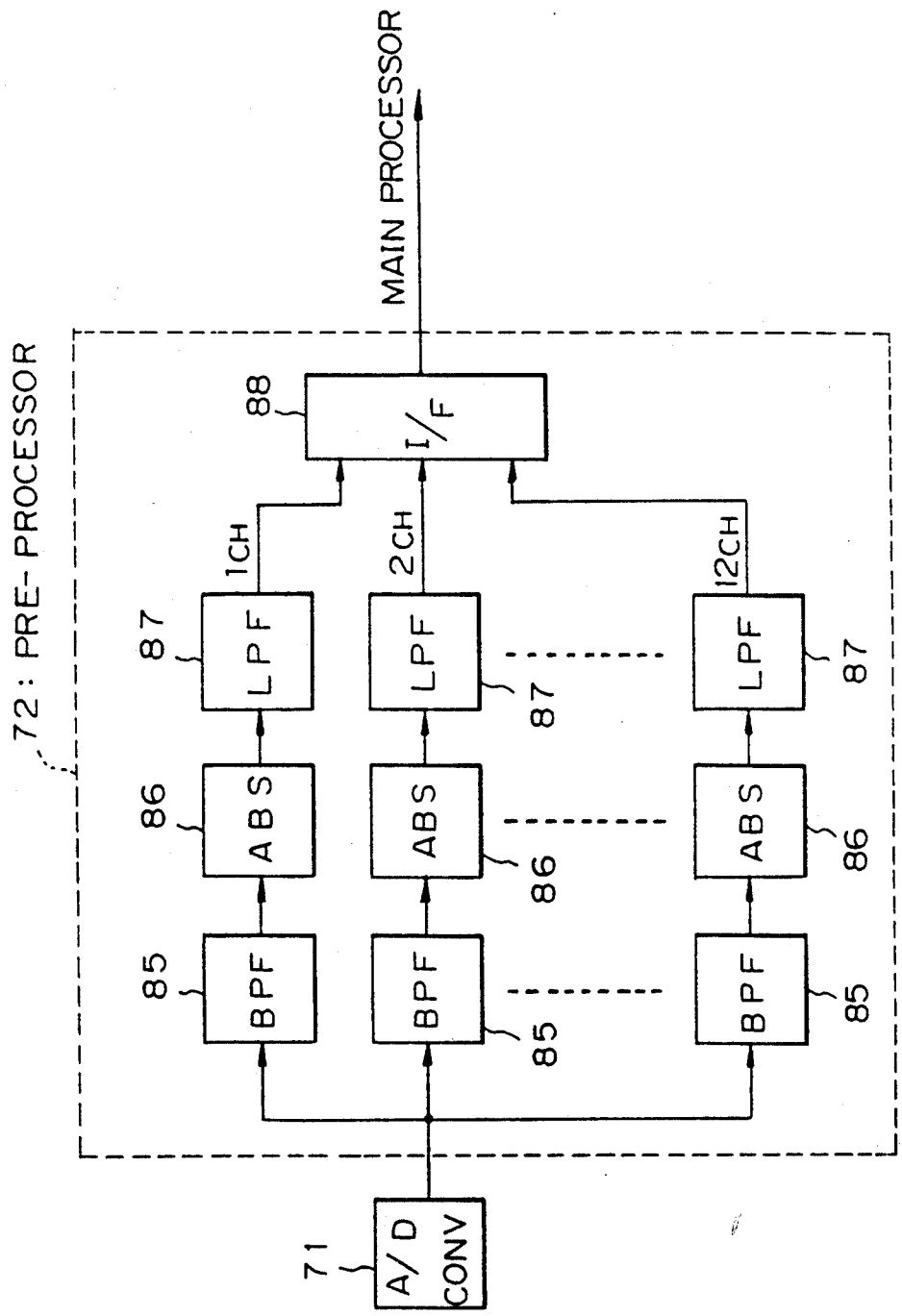
FIG. 8 is a block diagram showing the construction of a processor in the distance calculating part shown in FIG. 6.

FIG. 8 shows an example of the construction of the pre-processor 72 in detail. In the figure, the pre-processor 72 constitutes in this example a filter bank including a plurality of bandpass filters (BPF) 85, a plurality of absolute circuits (ABS) 86 functioning as detecting circuits, a plurality of low-pass filters (LPF) 87, and an interface circuit (I/F) 88. As the feature parameters output from the pre-processor 72, frequency components of the speech sound are used. For example, the number of bandpass filters (BPF) 85, the number of absolute circuits (ABS) 86, and the number of lowpass filters (LPF) 87 are respectively selected as 12 so that the input speech sound is divided into 12 channels of different frequency bands. From each channel, an output power is obtained. The output powers from the respective lowpass filters (LPF) 87 are output from the interface circuit (I/F) 88 at every 10 milliseconds.

Instead of the bandpass filter shown in FIG. 8, other means such as linear prediction code (LPC) coefficients can also be used to extract the features in the pre-processor 72.

Referring back to FIG. 7, the length of time between the beginning and the end of the speech signal detected by the speech interval detecting part 75 is normalized by the normalization part 77 to a predetermined time length. For example, each of the 12 channels of the feature parameters output from the memory 76 is divided along its time axis into 8 segments, and then the time length of the divided 8 segments is normalized. The number N of the feature parameters 50 in this case is:

$$N = 12 \times 8 = 96.$$

Accordingly, the input pattern output from the normalization part 77 consists of 96 feature parameters.

As the reference patterns 52, patterns corresponding to a plurality of speech words to be recognized are previously registered in the dictionary memory 80. When a reference pattern corresponding to a word is to be formed, it is necessary to pronounce the same word a hundred times, for example, to form a hundred patterns, and then to obtain the average value of respective feature parameters of the hundred patterns. The thus obtained average value is registered as a reference pattern 52 into the dictionary memory 80. In this embodiment, numerals are to be recognized. Therefore, ten reference patterns 52 are provided to correspond to the numerals "zero(0)" to "kyu(9)", respectively.

When the reference patterns 52 are to be formed, root-mean deviations of the respective feature parameters in the hundred patterns must be calculated. And then, weight pattern data is obtained in such a way that the average of the root-mean deviations multiplied by the weight pattern data is 1. The thus obtained weight pattern data is registered as the data of the weight patterns 56 in the dictionary memory 81. The data of the weight patterns 56 corresponds to the feature parameters 54 of the reference patterns 52. Therefore, the number of data of the weight patterns 56 corresponding to one reference pattern 52 is 96. Note that the procedure for forming the weight patterns 56 described above is only an example, and various other procedures such as a dispersion method may be employed.

In the distance calculating part 78, the absolute value of the difference between the feature parameter 50 of the input pattern 51 formed from the input speech and each feature parameter 54 of the reference parameters 52 is calculated, and then the absolute value of the difference is multiplied by the weight data 56. Alternatively, it is also possible to calculate a difference between the result which is obtained by multiplying the feature parameter 54 in the reference pattern 52 by the weight data, and the result which is obtained by multiplying the feature parameter 50 in the reference pattern 51. According to this calculating procedure, for 96 respective feature parameters 54 included in the reference patterns 52, the differences are obtained and summed to determine the distance between the input pattern 51 and the reference pattern 52. Further, for all the words registered as reference patterns 52, the above-mentioned calculations are effected and the obtained distances are sent to the tally calculating part 79. In the tally calculating part 79, the distances of the ten words are deemed as tallies and the word number of the reference pattern which relates to the least value of the tally is output to the dialer 82.

In the above-described construction, the operation of each part will be described in the following when a numeral "ichi(1)" is sent from the dialer 82.

First, when a speaker pronounces "ichi" into the microphone 70, the speech signal from the microphone is digitized in the A/D converter 71 and the speech interval of "ichi" is detected by the speech interval detecting part 75. Then the feature parameters 50 with 12 channels are stored in the memory 76. The time axis of each of the feature parameters 50 is divided into eight equivalent segments and is normalized (in other word, averaged) by the normalization part 77. The thus obtained pattern with the 96 feature parameters 50 is used as the input pattern.

In the dictionary memory 80, assuming that the reference patterns 52 are accessed in the order from 1 to 10. First, the absolute values of the distances between the feature parameters 54 in the reference pattern 52 corresponding to the number "ichi(1)" and the feature parameters 50 in the input pattern 51 are calculated. Data of the weight pattern 56 corresponding to the reference pattern 52 of "ichi(1)" are respectively multiplied by the 96 absolute values of the distances. The multiplied 96 values are summed to obtain the distance between the input pattern 51 and the reference pattern 52. Similar calculations are effected for the reference patterns of the numerals 2 to 9 and 0 to obtain the distances between the input pattern and the reference patterns. In the tally calculating part 79, the thus obtained distances are compared to each other to determine the shortest distance which is recognized as the reference pattern of "ichi(1)". Thus, the word number "1" of the reference pattern 52 of "ichi" is output to the dialer 82. In the dialer 82, the word number "1" is converted to a dial pulse and is sent to the line.

Alternative to the above-described distance calculation in the distance calculating part 78, it is also possible, according to the invention, to multiply the data of the weight pattern 56 by the feature parameters 54 in the reference patterns 52, and then to calculate the distances between the input pattern 51 and the reference parameters multiplied by the weight pattern 16.

In the above-described embodiment, the speech recognition for the ten numeral words is explained as an example. The subject of the recognition, however, is not restricted to numerals. Further, the unit of recognition may be not only a word but also a syllable. Still further, in the above embodiment, a discrete speech recognition is effected, however, continuous speech recognition is also possible according to the invention by making the speech interval detecting part 75 able to detect a speech interval of continuous speech.

As described above in detail, by using the speech recognizer according to the first embodiment of the present invention, even when the input speech signal fluctuates due to variation of the speech and the like, the probability of error recognition is reduced and the reliability of the speech recognition is improved.

SECOND EMBODIMENT

In the conventional preselection system, there was a problem in that a plurality of feature patterns are preselected in response to a single speech content. Therefore, in such a case, even when N feature patterns are preselected, the number of the preselected features corresponding to one spoken word becomes smaller than N so that there was a problem of a narrow preselection range.

According to the second embodiment of the present invention, the above-mentioned problem is resolved, and a preselection aparatus which can effectively preselect a wide range of preselections is provided. The second embodiment of the present invention will be described in the following with reference to FIGS. 9 to 11.

Figure 9:
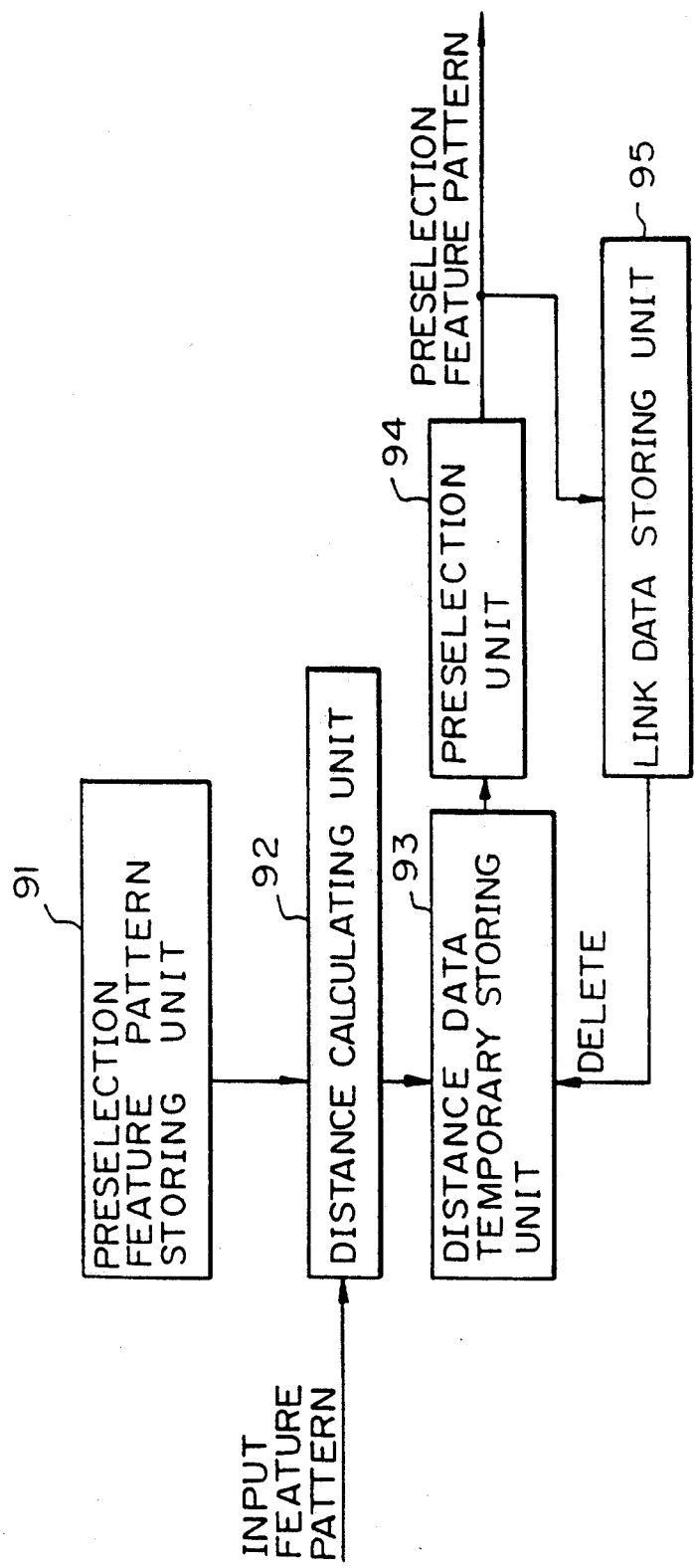
FIG. 9 is a block diagram showing the principle of a second embodiment of the present invention.

FIG. 9 is a block diagram showing a principle of the second embodiment of the present invention. In the figure, the speech recognizer according to the second embodiment of the present invention comprises a preselection feature pattern storing unit 91, a distance calculating unit 92, a distance data temporary storing unit 93, a preselection unit 94, and a link data storing unit 95.

The preselection feature patterns storing unit 91 previously registers and stores a plurality of groups of preselecting feature patterns corresponding to respective input speech words.

The distance calculating unit 92 calculates the distances between input feature patterns formed from the input speech word and the respective preselecting feature patterns stored in the preselection feature patterns storing unit 91.

The distance data temporary storing unit 93 temporarily stores the distance data corresponding to respective preselecting feature patterns.

The preselection unit 94 preselects and outputs a preselecting feature pattern relating to the minimum distance in the distances stored in the distance data temporary storing unit 93.

The link data storing unit 95 previously stores the relations between the respective feature patterns and all of the feature patterns in the groups to which the above-mentioned respective feature patterns belong.

All of the feature patterns in the group to which the selectively output preselecting feature patterns belong are output from the link data storing unit 95 and input into the distance data storing unit 93, whereby, from the distance data storing unit 93, the distance data corresponding to all of the feature patterns in the group to which the selectively output preselecting feature patterns belong are deleted.

The group to which the preselecting feature patterns selectively output from the preselecting unit 94 belong, is specified by the link data storing unit 95. Since the distance data corresponding to the specified feature pattern is deleted from the distance data temporary storing unit 93, a single preselecting feature pattern can be obtained for one input speech word at the output of the preselecting unit 94, and a plurality of feature patterns are not selected as in the conventional art. Therefore, according to the second embodiment of the present invention, the preselection range is not narrow.

Figure 10B:
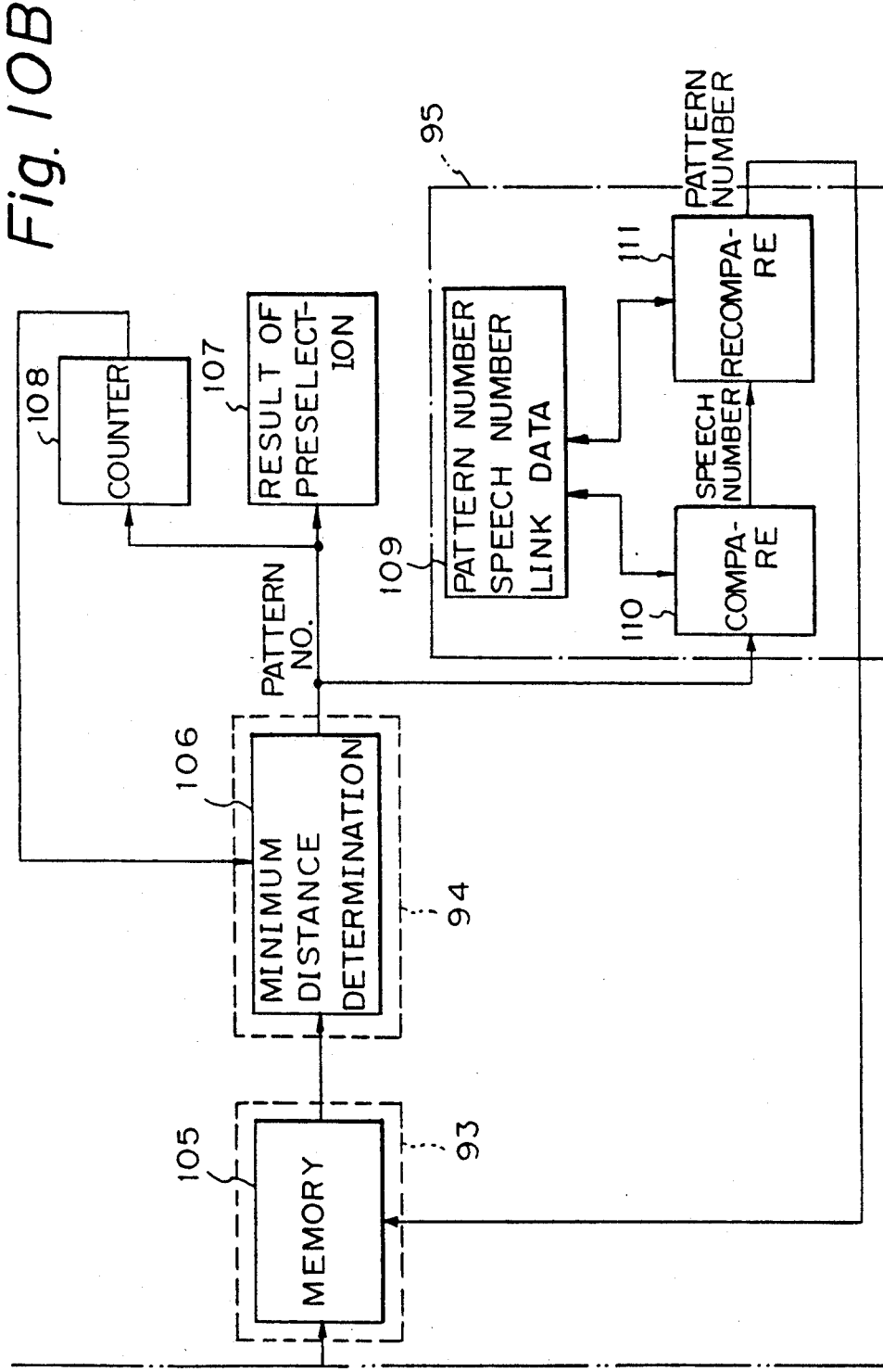

FIGS. 10A and 10B are block diagram showing the second embodiment of the present invention in detail. In the figure, the same reference numbers as in FIG. 9 represent the same parts. Namely, the preselecting feature pattern storing unit 91 includes a registered pattern number data memory 102 and a dictionary memory 103; the distance calculating unit 92 is constructed by a preselecting rough distance calculating unit 104; the distance data temporary storing unit 93 is constructed by a distance data temporary stacking memory 105; and the preselecting unit 94 is constructed by a minimum distance determining unit 106.

The link data storing unit 95 includes a pattern number—speech number link data storing memory 109, a comparing unit 110, and a recomparing unit 111.

The dictionary memory 103 includes a plurality of feature patterns and pattern numbers corresponding thereto.

The pattern number—speech number link data storing memory 109 stores link data for linking the pattern numbers and the speech numbers.

N feature patterns are preselected from the feature patterns stored in the dictionary memory 103 corresponding to one input feature pattern obtained at the output of the input pattern register 101 in response to an unknown input speech. At this time, the preselecting rough distance calculating unit 104 calculates the distances between the input feature pattern and all of the pattern numbers stored in the dictionary memory 103.

The distance data temporary stacking memory 105 temporarily stores the data obtained by the preselecting rough data calculating unit 104 and the pattern numbers of the feature patterns used for the calculations. The minimum distance determining unit 106 searches distance data which represents the minimum value in the distance data stored in the distance data temporarily stacking memory 105, and outputs the pattern number corresponding to the distance data. In the link data storing unit 95, the comparing unit 110 reads, from the pattern number speech number link data memory 109, the speech number corresponding to the pattern number output from the minimum distance determining unit 106, and inputs the speech number into the recomparing unit 111. The recomparing unit 111 compares and outputs one or more pattern numbers corresponding to the input speech number. In the distance data temporary stacking memory 105, the data corresponding to the pattern numbers output from the recomparing unit 111 are deleted from the distance data stored therein. The counter 108 drives the minimum distance determining unit 106 to inhibit output when N pattern numbers are counted. The N pattern numbers are sequentially stored in the preselection result storing memory 107.

Thus, the same speech number does not correspond to the N pattern numbers output from the minimum distance determining unit 106.

As described above, according to the second embodiment of the present invention, when a preselection is effected, a pattern number-speech number link data is used. And when N feature patterns are to be preselected, for the pattern number output from the minimum distance determining part 106, pattern numbers having the same speech number are detected by the use of the comparing part 110 and the recomparing part 111. Then the data stored in the distance data temporary stacking memory 105 and corresponding to the pattern numbers output from the recomparing part 111, are deleted.

Accordingly, the pattern number output from the minimum distance determining part 106 does not have the same pattern number as the pattern number previously output before the output of the pattern number.

Figure 11:
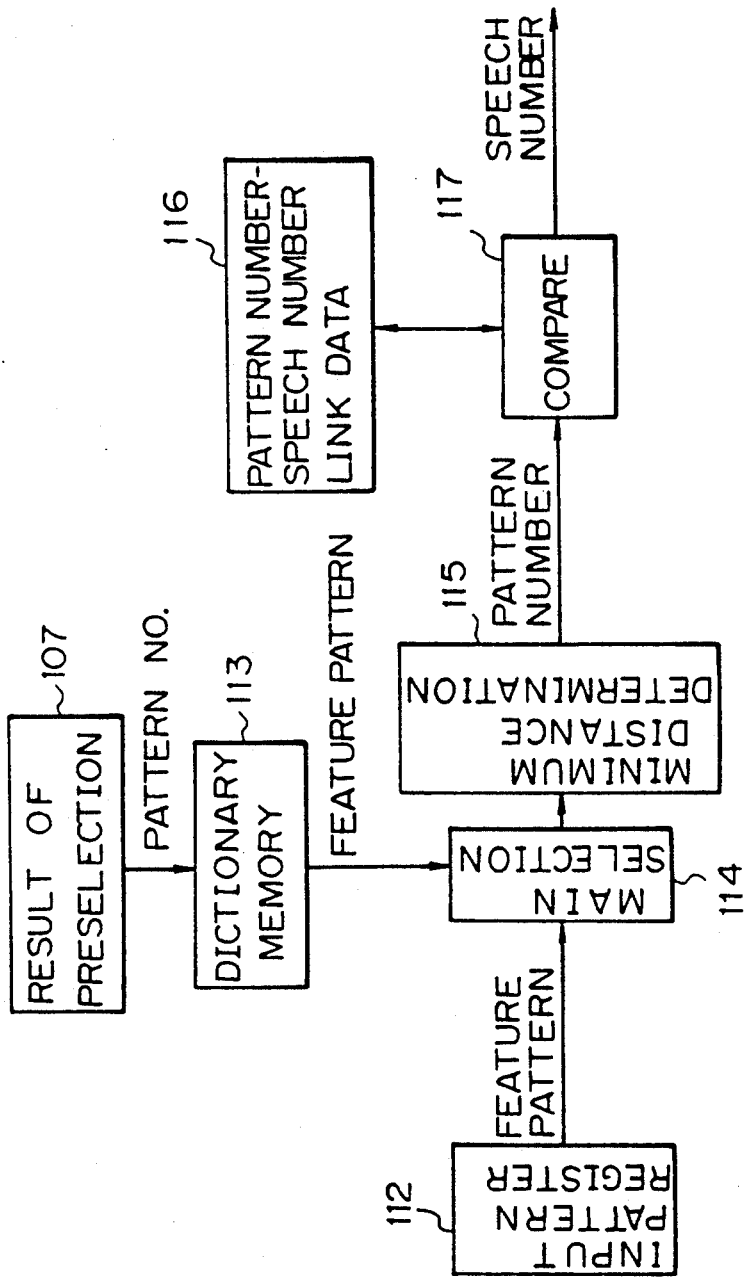
FIG. 11 is a block diagram showing a main selection processing part in the second embodiment of the present invention.

FIG. 11 is a block diagram showing the construction of the main selection processing part 33 in the system shown in FIG. 3. In the figure, the main selection processing part 33 includes an input pattern register 112, a dictionary memory 113, a main selecting distance calculating part 114, a minimum distance determination part 115, a pattern number-speech number link data memory 116, and a comparing part 117.

The input register 112 is the same as the input pattern register 101 shown in FIG. 9. The input register 112 outputs one feature pattern in response to one input speech word. The dictionary memory 113 outputs N feature patterns preselected based on the pattern numbers output from the preselected result storing memory 107 which is shown in FIG. 10. The main selecting distance calculating part 114 calculates the distances between the feature patterns from the input pattern register 112 and the feature patterns from the dictionary memory 113. The minimum distance calculating part 115 determines the minimum distance in the calculated distances, and outputs the pattern number corresponding to the minimum distance. The comparing part 117 reads, from the pattern number-speech number link data storing memory 116, a speech number corresponding to the input pattern number, and outputs it.

Figure 12:
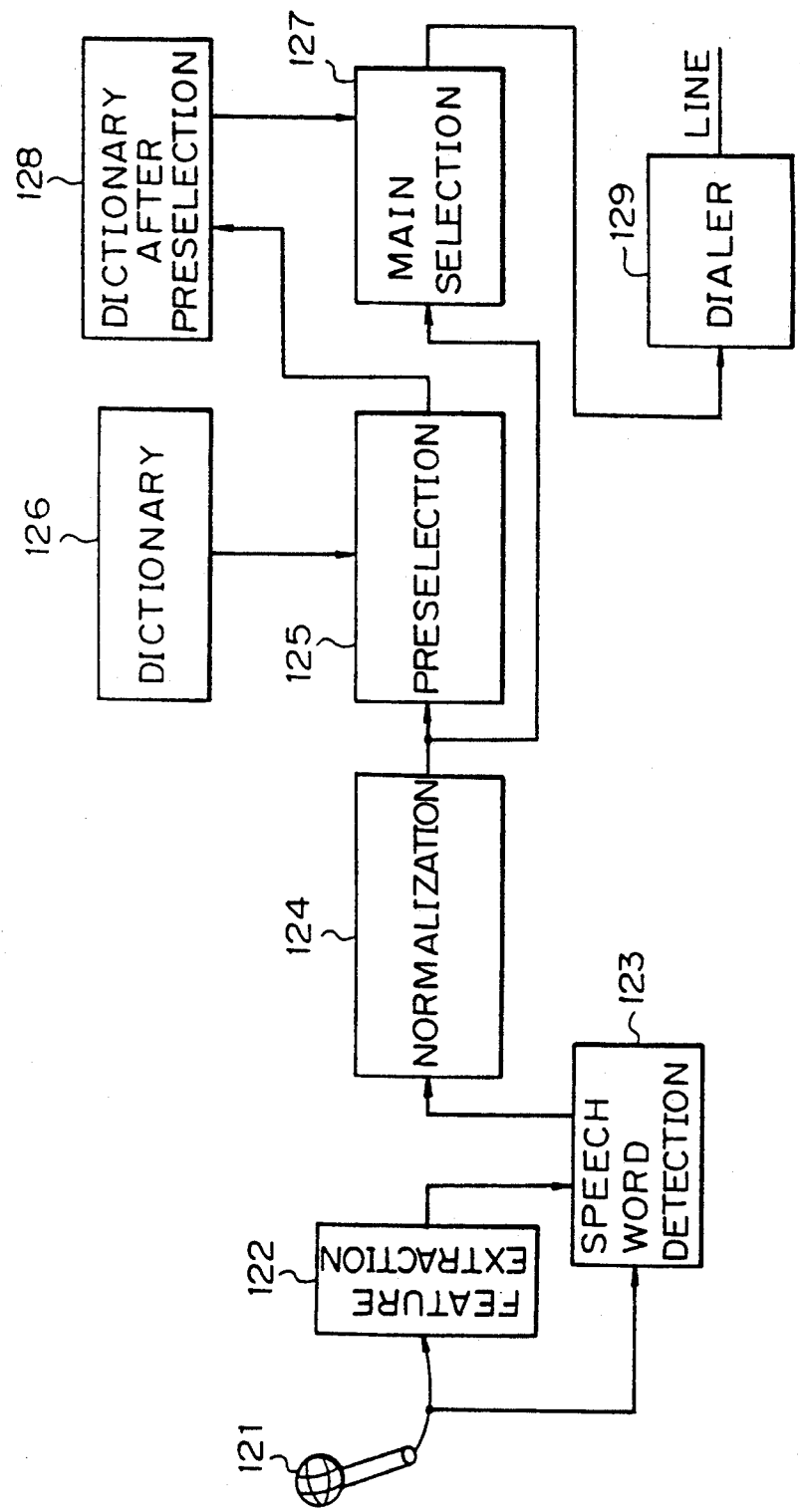
FIG. 12 is a block diagram for explaining the operation of the speech recognizer according to the second embodiment of the present invention.

FIG. 12 is a block diagram for explaining the operation of a speech recognizer according to the second embodiment of the present invention. In the figure, as a preselection processing part 125, the preselecting system shown in FIG. 10 is used; and as a main selection processing part 127, the main selection system shown in FIG. 11 is used. Assuming that the speech recognizer shown in FIG. 12 is applied to a ten numeral speech recognizer as an automatic dialing device, in the following, the operation of each block in FIG. 12 is explained.

FEATURE EXTRACTING PART 122

By the use of 12 channel-bandpass filter (BPF), the input speech signal is divided into 12 bands. For each channel, a rectified value, i.e., absolute value smoothed by a lowpass filter, is obtained. Each channel value is output at every 10 milliseconds.

The 12 channel outputs at every 10 milliseconds are converted into logarithms, and then the 12 channel data are averaged. Then the difference between the average value and the value of each channel is output.

SPEECH INTERVAL DETECTING PART 123

The beginning and the end of the speech interval are found by determining whether the input speech power is higher or lower than a certain threshold level. Then, the data output from the feature extracting part 122 during the detected interval is stored.

An example of the method for detecting the beginning is as follows. When the input speech power is higher than the threshold level for five or more continuous frames (50 ms), the beginning is determined at the time when the power changes from the low level to the high level.

An example of the method for detecting the end is as follows. After detecting the beginning, when the input speech power is lower than the threshold level for thirty or more continuous frames (300 ms), the end is determined at the time when the power changes from the high level to the low level.

NORMALIZATION PROCESSING PART 124

Each of the different speech intervals from the beginnings to the ends are divided into eight sections along the time axis. Then, in each of the divided intervals, averaging is effected. Whereby, 12 channels × 8 frams = 96 feature parameters are obtained.

DICTIONARY 126

Using learned speech sounds, three feature patterns are formed and recorded for one speech input, by the use of the speech interval detecting part and the normalization processing part.

The registered speech contents are "ichi" for the spoken number 1, "ni" for the spoken number 2, and so forth. All of the ten words for the numerals are registered. Note that "zero" is registered for the number 10.

Accordingly, the number of the registered feature patterns is 30.

PRESELECTION PROCESSING PART 125

This portion is a part to which the present invention is applied. The construction is the same as that shown in FIG. 10.

A feature pattern in this embodiment has 96 parameters, i.e., 12 channels × 8 frames = 96 parameters. In even channels (2, 4, 6, 8, 10, 12), and for each frame, the absolute values of the differences between the input feature patterns and the corresponding parameters of the feature patterns in the dictionary are obtained, and then these absolute values are summed to be used as the preselecting distance.

The number of the preselecting patterns is 10.

Accordingly, from the 30 patterns in the dictionary, preselection is effected whereby a new dictionary of 10 patterns is formed.

MAIN SELECTION PROCESSING PART 127

From the 10 patterns formed by the preselection processing part 127, one pattern (one speech sound) is selected. The construction is as shown in FIG. 11.

In the distance calculation used in the main selection, a dynamic programming (DP) method is employed to use precise distances in which time fluctuation is taken into consideration.

In non-linear matching, the DP method is a typical method. This method is also known as a rubber (or elastic) matching because the matching operation is effected by expanding and contracting the time axis.

The DP matching is a method in which, when the distance between a reference pattern and an input pattern is to be calculated, the time sequence information of both patterns are made not to correspond to each other in a one by one correspondence, but both patterns are made to correspond to each other in such a way that the input pattern is partially shifted so that the distance between the two patterns becomes minimum.

DIALER 129

This receives the speech number output from the main selection processing part 127, and outputs corresponding pulses to the line.

Next, an operation is explained when a speaker generates a "1".

First, the speaker pronounces "ichi" to the microphone 121.

The speech interval detecting part 123 detects the beginning and the end of the "ichi", and stores the data output during that speech interval.

Then, the normalization processing part 124 performs the normalization of the time axis for each of the stored speech parameters, to form the feature pattern with 96 parameters.

Next, the preselection processing part 125 calculates the preselecting distances between the feature pattern formed in response to the input speech sound and the 30 feature patterns in the dictionary, and selects 10 feature patterns from the 30 feature patterns. The selected 10 feature patterns are stored in the dictionary 128.

Next, the main selection processing part 127 calculates the main selecting distances based on the feature pattern formed by the input speech sound and the 10 feature patterns included in the dictionary storing the preselection results. Then, it determines the pattern number relating to the feature pattern which represents the minimum value of the main selecting distances, and outputs the speech number (1) corresponding to the determined pattern number.

Next, in response to the speech number (1), the dialer 129 outputs the signal "1" to the line.

Here, the operation of the preselection processing part 125 will be described in more detail with reference to FIG. 10.

In the input pattern register 101, a feature pattern formed by the input speech sound is recorded.

The registered pattern number data memory 102 stores data of for example (11, 12, 13, 21, 22, 23, ..., 01, 02, 03). In this case, the upper order digit represents the number of the speech sound and the lower order digit represents the threshold number. At the registering time, three patterns X1, X2, and X3 are registered for one speech sound XU.

The preselecting rough distance calculating part 104 treats all parameters of the even channels to calculate the absolute values of the differences between the input feature pattern and the feature patterns in the dictionary and sum the absolute values to obtain the preselecting rough distance.

For the input pattern, the preselecting distance of each feature pattern is recorded with its pattern number into the distance data temporary stacking memory 105.

Next, the minimum distance determining part 106 detects the distance which represents the minimum value in the distance data, and outputs its pattern number.

Although the pattern number output at this time is not always the pattern number (11, 12, 13) belonging to the speech number 1, the pattern number is deemed as a candidate and is recorded as a preselected result into the preselection result memory 107.

Simultaneously, the output pattern number of, for example, 21, is input into the comparing part 110 which then reads the speech number 2 corresponding to the pattern number 21 from the pattern number-speech number link data memory 109 and outputs the same.

The speech number 2 output from the comparing part 110 is input into the recomparing part 111 which then refers to the data stored in the pattern number-speech number link data memory 109 to output the pattern number (21, 22, 23) corresponding to the speech number 2.

Next, the feature patterns corresponding to the pattern number (21, 22, 23) are deleted from the distance data temporary stacking memory 105.

Then, similar to the previous operation, the pattern number obtained by the minimum distance determining part 106 is added to the preselected result.

The above operations are repeated until the preselected results reaches 10 patterns.

As described above, according to the second embodiment, since the pattern numbers corresponding to the same speech number are deleted, in the selected feature patterns in the preselection, a plurality of patterns corresponding to the same speech content are not selected so that the recognition rate is improved.

THIRD EMBODIMENT

The third embodiment relates to a speech recognizer in which a dictionary for storing feature parameters of speech sounds to be recognized stores a similarity function.

In the conventional speech recognizer shown in FIG. 1, there was a problem in that the same weight data are applied to all of the parameters, i.e., no weight is taken into account, as described before.

In the third embodiment, a similarity function is employed to improve the performance of word recognition.

Figure 13:
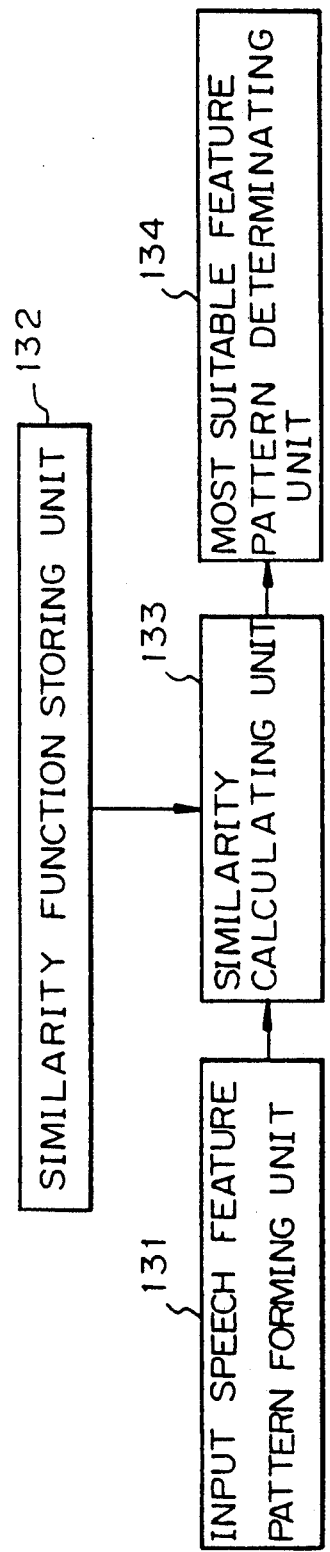
FIG. 13 is a block diagram showing the principle of a third embodiment of the present invention.

FIG. 13 is a block diagram showing the principle of the third embodiment of the present invention. In the figure, the speech recognizer according to the third embodiment comprises an input speech feature pattern forming unit 131, a similarity function storing unit 132, a similarity calculating unit 133, and a most suitable feature pattern determining unit 134. The input feature pattern forming unit 131 forms a feature pattern of an unknown input speech sound. The similarity function storing unit 132 stores similarity functions each representing a distribution of similarity with respect to values of a parameter in a feature pattern of a speech sound. The similarity calculating unit 133 calculates the similarities between an input pattern and a plurality of known patterns by the use of the corresponding similarity functions in the similarity function storing unit 132 and the values of input feature parameters. The most suitable pattern determining unit 134 determines the most suitable feature pattern based on the output of the similarity calculating unit 133.

Figure 14:
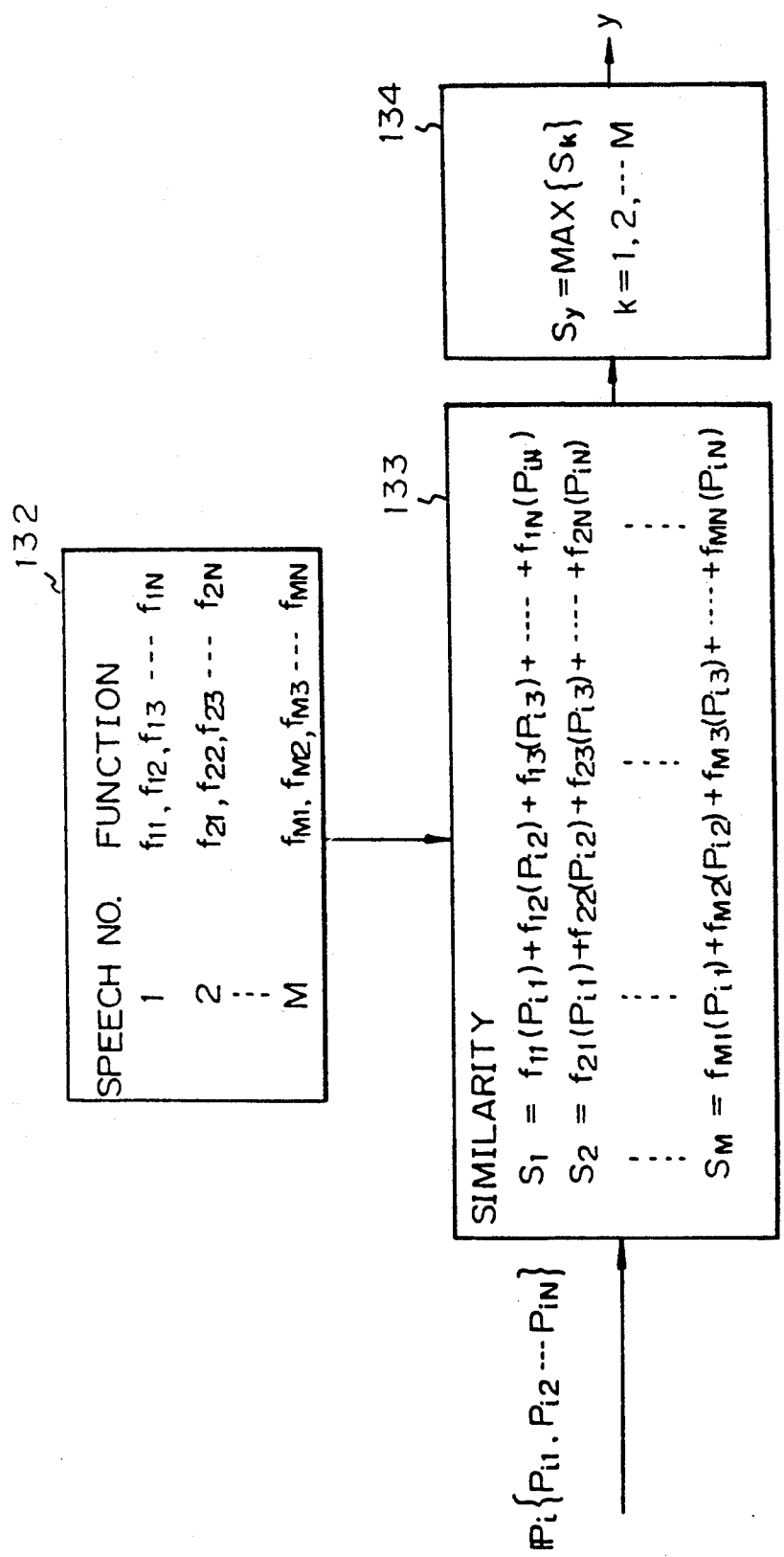
FIG. 14 is a diagram showing an example of the calculation using similarities according to the third embodiment of the present invention.

FIG. 14 is a block diagram for explaining the operation of the speech recognizer shown in FIG. 13. In the figure, the similarity function storing unit 132 stores the similarity functions $f_{mn}$, where m=1,2, . . . , or M and n=1,2, . . . , or N. The similarity function $f_{mn}$ represents a similarity function of a feature parameter $P_n$ in a speech word having a speech number m. Each similarity function is a function of a value of the corresponding feature parameter. At the time of recognizing the input speech sound, the similarity calculating unit 133 calculates a similarity $S_k$ between the input speech sound and a speech sound of a speech number k by the use of the respective parameter values $P_{i1}$, $P_{i2}$, . . . ,$P_{in}$ of the parameters $P_1$, $P_2$, . . . , $P_N$ in the input speech sound $P_i$ as its input and the similarity functions $f_{kn}$ (k=1,2, . . . , M; n=1,2, . . . , N) stored in the similarity function storing unit 132 and corresponding to the speech number k.

The most suitable feature pattern determining unit 134 determines the maximum similarity $S_y$ in the similarities obtained as above, and outputs the speech number y.

The similarity between the speech sound of the speech number k and the input speech sound is expressed as:

$$S_k = \sum_{n=1}^{N} f_{kn}(P_{in})$$

where, $S_k$ is a similarity between the input speech sound and the speech sound of the speech number k;

N is the number of parameters in one speech pattern;

$f_{kn}$ is a similarity function of a feature parameter $P_n$ in the speech sound of the speech number k; and $P_{in}$ is a parameter value of an n -th feature parameter in the feature pattern of the input speech sound.

Figure 15:
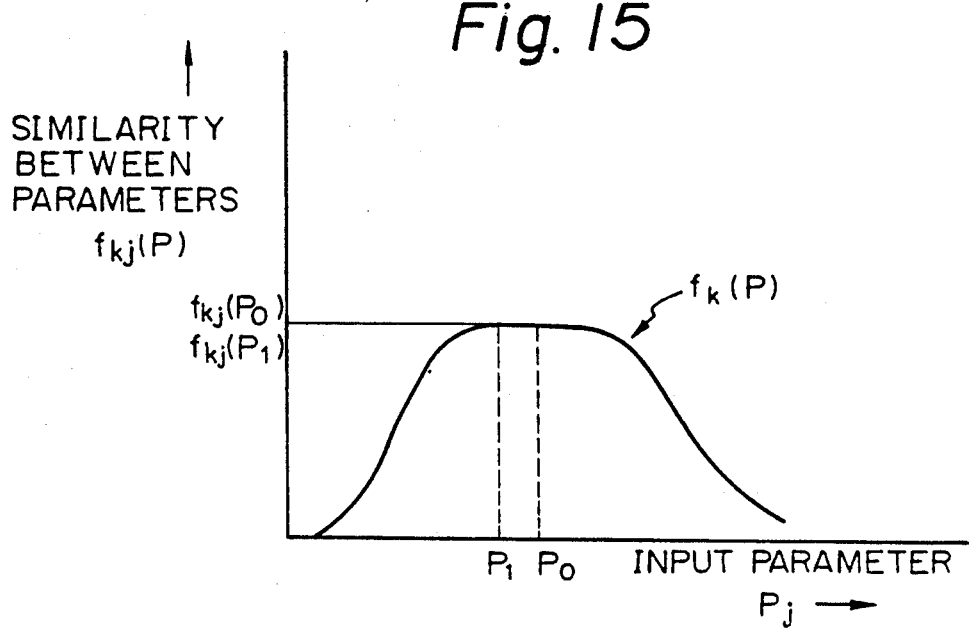
FIG. 15 is a graph showing an example when similarities are close to each other even when input parameters are different, for explaining the third embodiment of the present invention.

FIG. 15 is a graph of a similarity function $f_{kj}(P)$ in an example when the similarities are close to each other even when the input parameter values are different.

The similarity $f_{kj}$ is a function of the value of the input feature parameter $P_{ij}$. The value $P_0$ in the figure is the value of the input feature parameter $P_j$ in an input pattern $P_0$; and the value $P_1$ in the figure is the value of the same input feature parameter $P_j$ in an input pattern $P_1$. The difference $f_{kj}(P_1) - f_{kj}(P_0)$ in the similarity functions in the graph shown in FIG. 15 is almost zero. Namely, in case the similarity function is as shown in the graph shown in FIG. 15, even when the input speech sounds for the same word fluctuate so that the values of the feature parameter $P_j$ in the two feature patterns for the same input speech content are slightly changed, it does not seriously influence the similarity.

Figure 16:
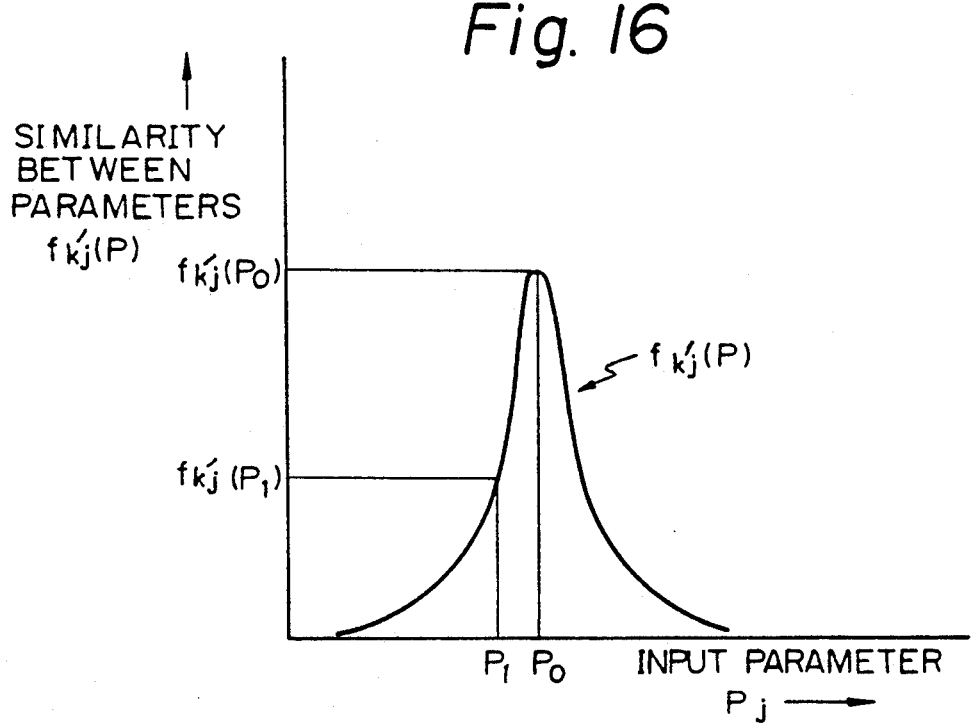
FIG. 16 is a graph showing another example when similarities are quite different even when input parameters are only slightly varied, for explaining the third embodiment of the present invention.

FIG. 16 is a graph of a similarity function $f_{kj}(P)$ in an example when the similarities are considerably different from each other when the input parameter values are different.

The similarity $f_{k,j}$ is a function of the value of the input feature parameter $P_{ij}$. The value $P_0$ in the figure is the value of the input feature parameter $P_j$ in an input pattern $P_0$; and the value $P_1$ in the figure is the value of the same input feature parameter $P_j$ in a input pattern $P_1$. The difference $f_{k,j}(P_1) - f_{k,j}(P_0)$ in the similarity functions in the graph shown in FIG. 16 is not zero. Namely, in case the similarity function is as shown in the graph shown in FIG. 16, when the input speech sounds for the same word fluctuate so that the values of the feature parameter $P_j$ in the two feature patterns for the same input speech content are slightly changed, it seriously influences the similarity.

There may be various kinds of similarity functions such as those shown in FIG. 15 and FIG. 16.

In the third embodiment of the present invention, the similarity $S_1$ between an input pattern $P_i$ and a speech pattern of a speech number 1 is calculated as the sum of the values of the similarity functions $f_{11}, f_{12}, \ldots, f_{1N}$ as shown in FIG. 14. The other similarities are also calculated in the same way. From the maximum similarity $S_y$, the speech number of the most similar pattern to the input pattern can be obtained.

Figure 17:
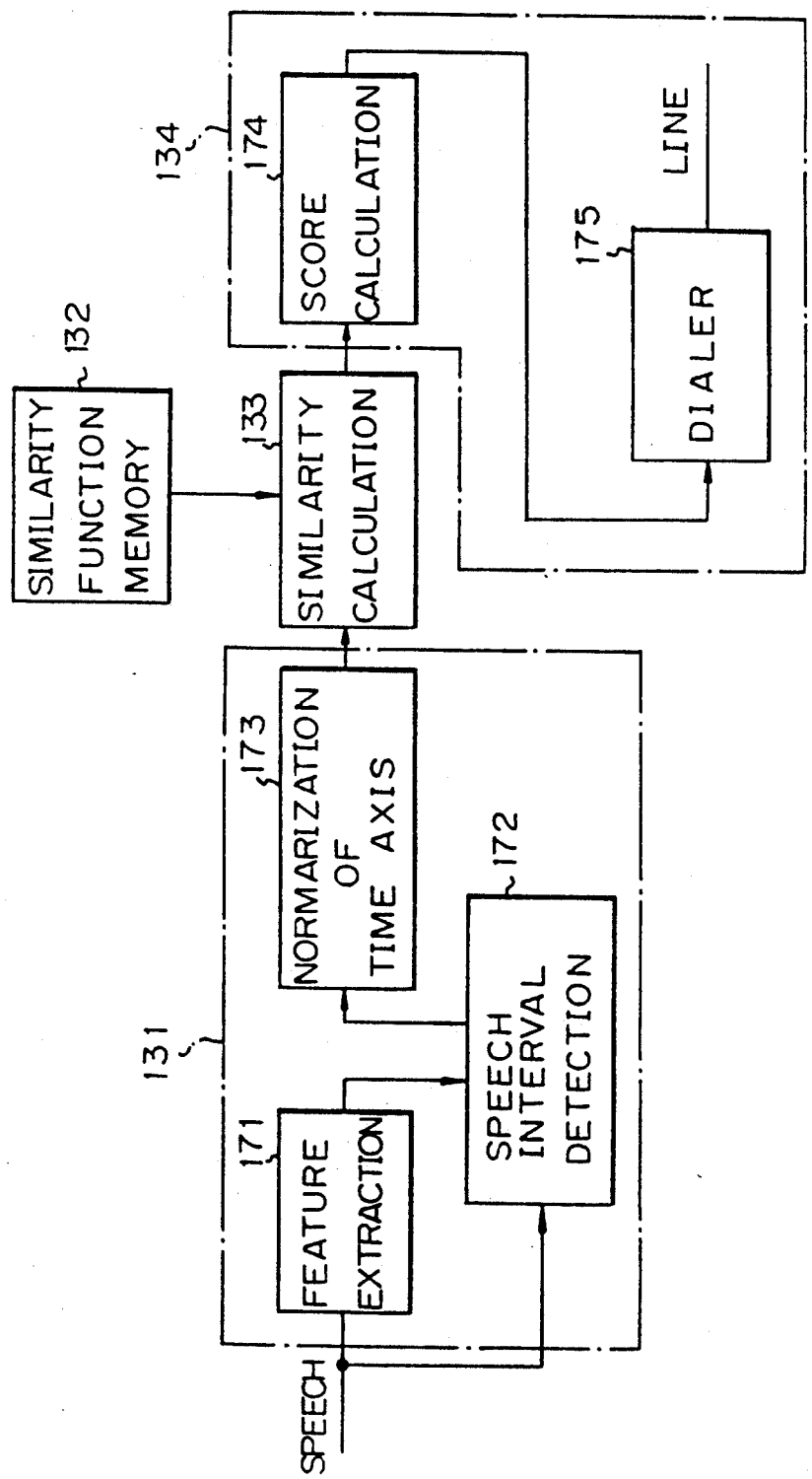
FIG. 17 is a block diagram showing in detail the third embodiment of the present invention.

FIG. 17 is a block diagram showing a speech recognizer according to the third embodiment of the present invention. In the figure, the same reference numerals as in FIG. 13 represent the same parts. The similarity function memory 132 is a dictionary which is formed as follows. Namely, under most suitable circumstances, the same word is pronounced 100 times to form respective feature patterns. Then the fullscale representation of each feature pattern is divided into 128 segments to form a histogram for each parameter. The histogram of each parameter is then normalized by using the maximum number of sample times. The normalized histogram is then used as a similarity function and is stored as a dictionary.

Namely, the similarity function in the third embodiment is a normalized histogram in which the input is the parameters of the input speech feature pattern and the output is the normalized number of times.

The content of the speech sound is a numeral such as "ichi", "ni", "san" and the like. The respective speech sounds are allocated to speech numbers 1, 2, 3, and the like.

The similarity calculation part 133 has an input for receiving respective parameters of the feature pattern formed by the input speech sound, and calculating parameter similarities based on the corresponding similarity functions in the similarity function memory 132. The sum of the parameter similarities calculated based on the group of the similarity functions corresponding to the respective speech numbers is output as the similarity between the speech sound corresponding to the speech number and the input speech sound.

The input speech sound feature pattern forming unit 131 shown in FIG. 13 includes a feature extracting circuit 171, a speech interval detecting circuit 172, and a time-axis normalization circuit 173.

The feature extracting circuit 171 divides the input speech signal into 12 bands by the use of a 12 channel bandpass filter to obtain respective channel powers which are output at every 10 miliseconds.

The speech interval detecting circuit 172 detects the beginning and the end of a speech sound (word) by supervising the power of the input speech sound, and stores the data output during that interval from the feature extracting circuit 171.

The time axis normalization circuit 173 divides each of the time axes of the data having different lengths of speech sound from the beginnings to the ends into eight, and the divided sections are averaged with respect to the time axis, whereby a feature pattern with 12 channels $\times$ 8 frames = 96 parameters is formed.

The most suitable feature pattern determining unit 134 shown in FIG. 13 includes a tally (i.e., score) calculating circuit 174, and a dialer 175.

The above-mentioned processes are effected for all 10 of the registered words.

The tally calculating circuit 174 treats the similarities of the ten words as the scores and determines to output the speech number which represents the maximum tally.

The dialer 175 converts the speech number calculated by the tally calculating circuit 174 into a corresponding pulse signal.

Figure 18:
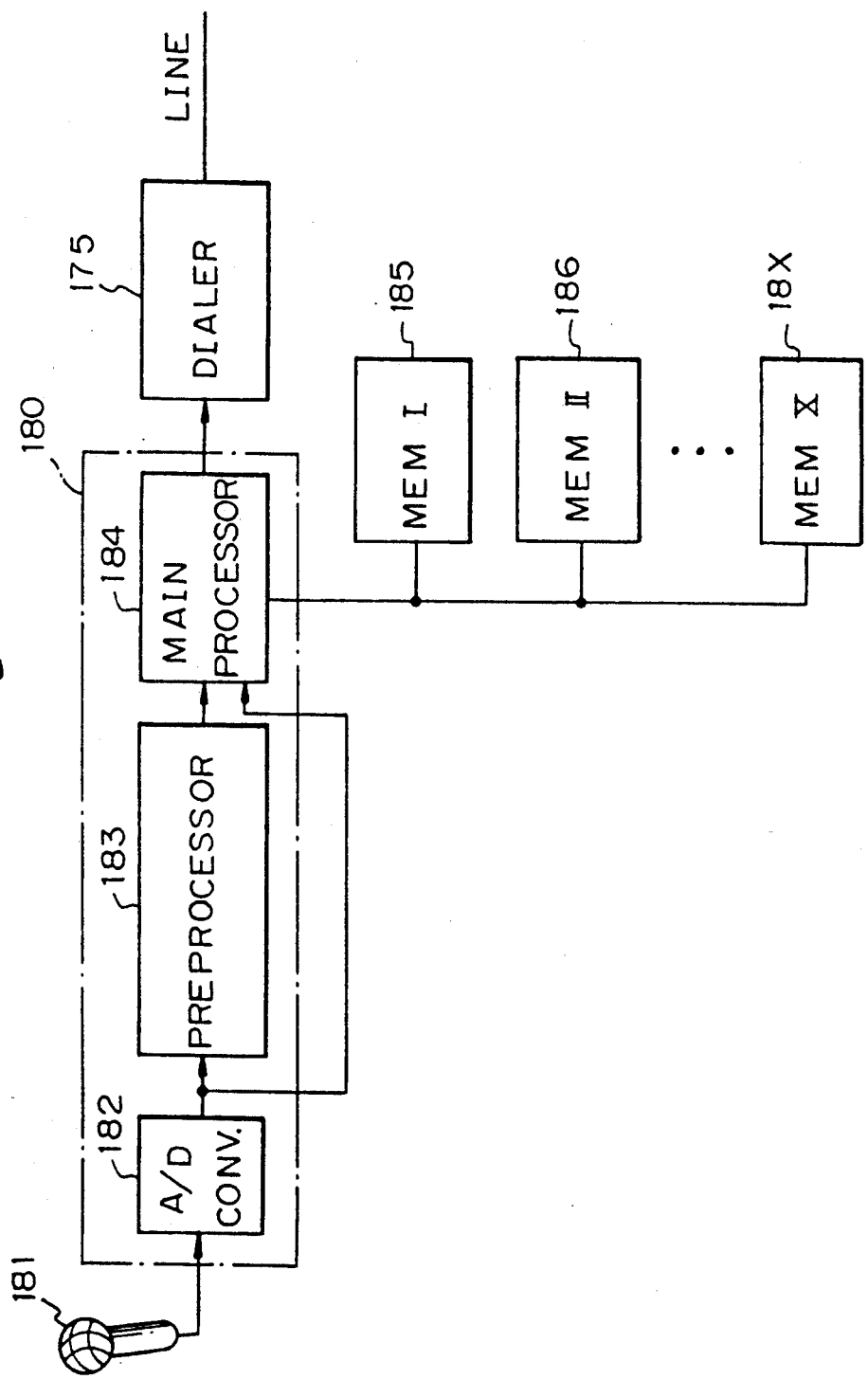
FIG. 18 is a block diagram showing an example of an application of the present invention to an automatic speech dialer.

FIG. 18 is a block diagram showing an automatic dialing system to which the above-described third embodiment of the present invention is applied for the 10 numeral words recognition. In the figure, the feature extracting circuit 171, the speech interval detecting circuit 172, the time-axis normalization circuit 173, the similarity function memory 132, the similarity calculating part 133, and the tally calculating part 174 in FIG. 17 are constructed by a processor 180 including an A/D converter 182, a preprocessor 183, and a main processor 184. The main processor 184 receives the outputs of a memory 185, 186, . . . , 18x for storing the similarity functions corresponding to the speech numbers 1 to 10.

The constitution of the preprocessor 183 is the same as that shown in FIG. 8.

Figure 19:
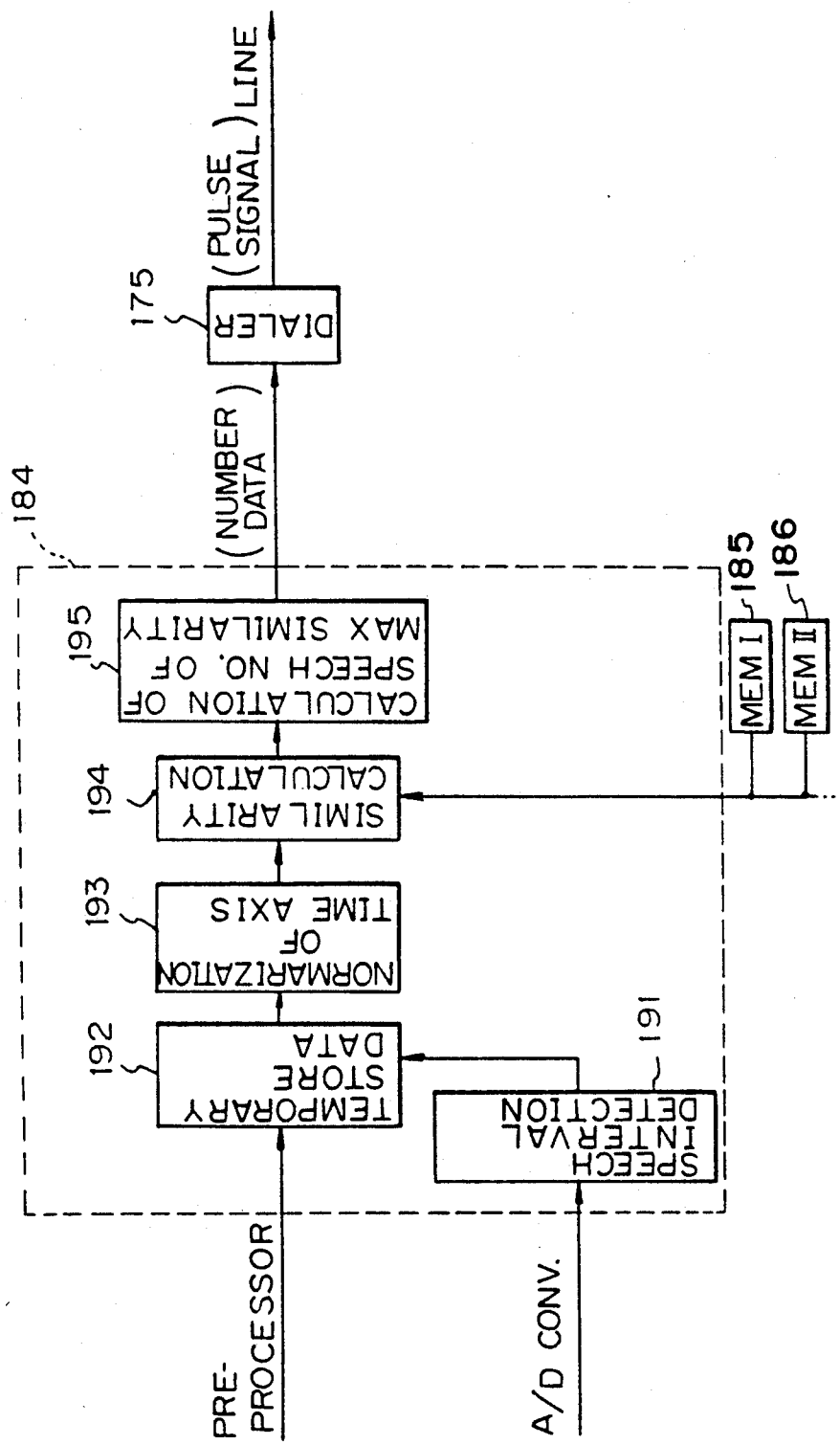
FIG. 19 is a block diagram showing the construction of the main processor in the third embodiment of the present invention.

FIG. 19 is a block diagram showing the constitution of the main processor 184 shown in FIG. 18. As shown in the figure, the main processor 184 includes a speech interval detecting part 191, a memory 192 for temporarily storing the output data from the preprocessor 183, a time-axis normalization part 193, a similarity calculation part 194, and a speech number selecting part 195 for selecting the speech number which represents the maximum value of the similarities.

The memories 185,186, . . . , 18x and the dialer 175 are the same as those shown in FIG. 18 and are denoted by the same reference numbers. The outputs of the memories 185, 186, . . . are input to the similarity calculating part 194.

An operation of the speech recognizer according to the third embodiment will be given in the following with reference to FIGS. 17 to 19 for the case when the user generates a "1".

First, the speaker pronounces "ichi" into the microphone 181. The input signal is converted into a digital signal by the A/D converter 182. The digital signal is passed through 12 channels in the preprocessor 183 so that each channel passes a necessary frequency band. The speech interval detecting part 172 (FIG. 17) or 191 (FIG. 19) detects the interval of the input "ichi". The features extracted by the feature extracting part 171 are stored in the memory 192 for temporarily storing data.

Next, the stored speech features are divided along the time axes into eight equivalent sections by the normalization part 173 in FIG. 17 or 193 in FIG. 19. The features in the corresponding sections are averaged. The data thus obtained is used as a feature pattern. Accordingly, the feature pattern consists of 8 frames $\times$ 12 channels = 96 parameters.

Assuming that the memory 185 stores the similarity functions of the speech number 1. Then, from the similarity functions, stored in the memory 185, of the speech number 1 corresponding to "ichi", the parameter similarities are calculated by the use of the similarity functions corresponding to the respective parameters of the input speech feature pattern. The thus calculated similarities are summed, and the summed value is determined as the similarity $S_1$ to the speech number 1 (see FIG. 14).

The other similarities to the other speech numbers are calculated similarly.

Next, the largest value is searched from these similarities. The word number corresponding to the maximum value is then output to the dialer 175. In this case, the word number "1" is output.

The dialer 175 converts the word number "1" to a dial pulse and outputs it to the line.

Since the similarities are calculated for respective parameters of the input speech sound, and the speech number with the maximum similarity is searched, the error recognition rate of the input speech is reduced even when the input speech fluctuations of the parameters of the input speech are only slightly varied.

Figure 20:
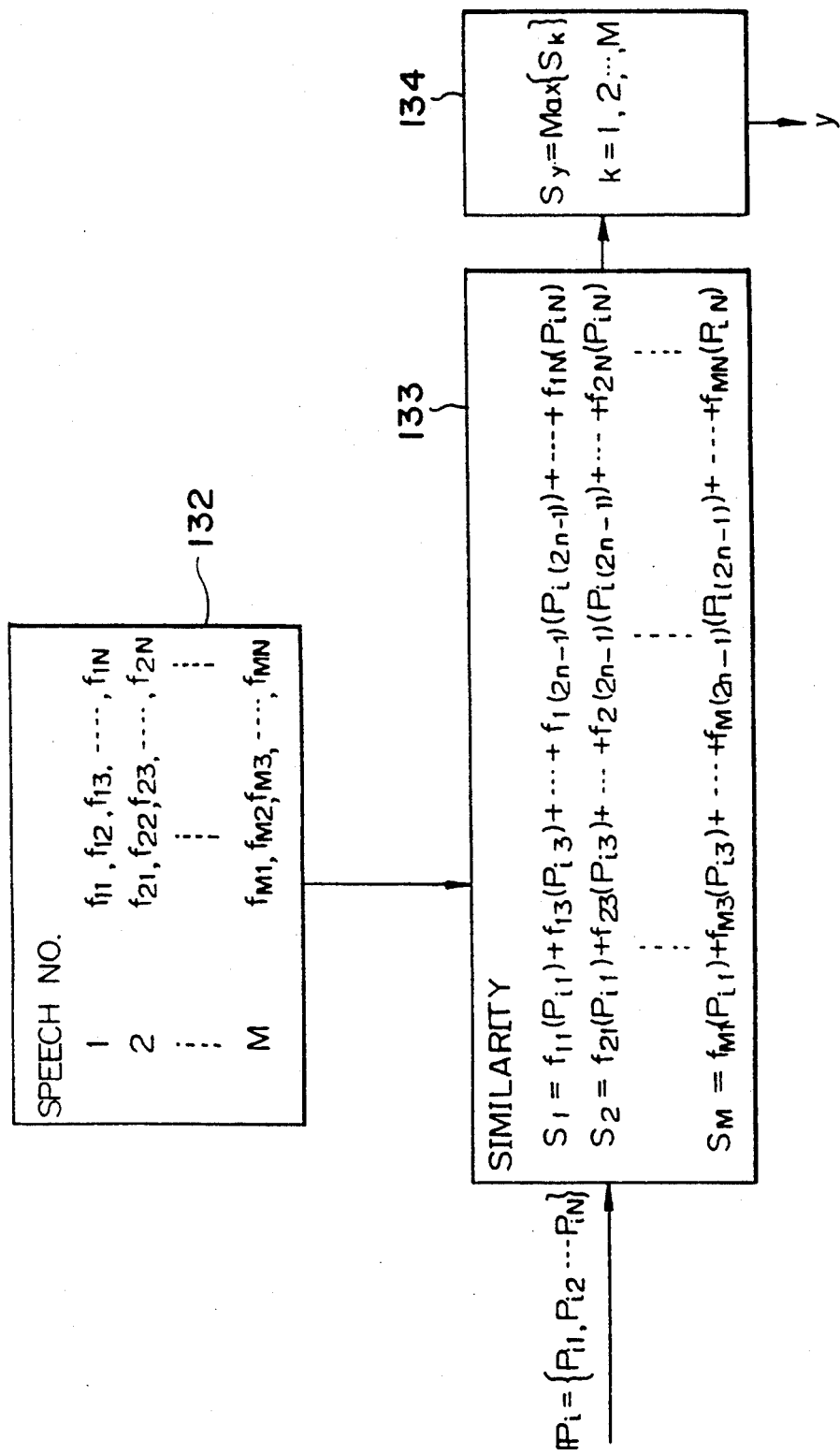
FIG. 20 is a diagram showing an example of the calculation of similarities used in the preselection according to the third embodiment of the present invention.

The above described third similarity functions and the similarities can be applied to the preselecting system as described in the second embodiment. Namely, instead of the preselection feature pattern storing unit 91 and the distance calculating unit 92 shown in FIG. 9, the similarity function storing unit 132, the similarity calculating unit 133, and the most suitable feature pattern determining unit 134 shown in FIG. 13 may be employed according to another embodiment of the present invention. In this case, to simplify the calculation of the similarities, in place of summing all of the similarities between feature parameters, alternate similarities between feature parameters are summed as shown in FIG. 20.

Further, instead of the preselection feature pattern storing unit 91 and the distance calculating unit 92 shown in FIG. 9, the dictionary memory 80 including the reference patterns 52, the dictionary memory including the weight patterns 56, and the distance calculating part 78 shown in FIG. 7 may be employed according to still another embodiment of the present invention.

All of the above-described embodiments are the case applied to a ten numeral words speech recognition. The present invention, however, is not restricted to the recognition of the ten numerals, but may be applied to the recognition of words other than the numerals. Further, the unit of the recognition may be other than words, for example, syllables.

Still further, in place of the discrete speech recognition, continuous speech recognition is also possible according to the present invention by making the speech interval detecting part able to detect a speech interval of continuous speech.

Still further, the feature extracting part in the above described embodiments is realized by a preprocessor constructed by a bandpass filter or the like, however, it may be realized by other means such as linear predictive code (LPC) coefficients.

Still further, in the third embodiment, the similarity function stored in the similarity function memory 132 is the normalized histogram, however, this is only an example, and other high order functions may also be used.

From the foregoing description, it will be apparent that, according to the present invention, the probability of error recognition is reduced and the reliability of the input speech recognition is improved.

We claim:

1. An isolated speech word recognizer for recognizing an input pattern as one of a plurality of known patterns, comprising:

similarity information storing means for storing similarity information representing the degree of significance of features in each of the known patterns for recognizing the features; and most similar pattern determining means, operatively connected to said similarity information storing means, for determining one of said plurality of known patterns as a most similar pattern to the input pattern by the use of the similarity information, a plurality of input feature parameters and a plurality of reference feature parameters, wherein the similarity information is a plurality of weight patterns respectively corresponding to the plurality of known patterns, each of the weight patterns representing the degree of significance of the features of the known patterns to recognize the most similar pattern, wherein said speech word recognizer further comprises:

feature parameter extracting means, operatively connected to said most similar pattern determining means, for extracting the plurality of input feature parameters from the input pattern; and reference pattern storing means, operatively connected to said most similar pattern determining means, for storing a plurality of reference patterns as the known patterns each having a plurality of reference feature parameters, and wherein the weight pattern of each of the reference patterns having a plurality of weight parameters corresponding to the plurality of reference feature parameters in each of the plurality of reference patterns, each of the weight parameters being smaller than a predetermined value when the corresponding reference feature parameter is significant to recognize the reference pattern corresponding thereto, and being larger than the predetermined value when the corresponding reference feature parameter is not significant to recognize the reference pattern corresponding thereto, wherein said most similar pattern determining means comprises:

distance calculating means for calculating distances between the input pattern and the plurality of reference patterns; and multiplying means for multiplying the calculated distances by the weight patterns corresponding thereto to obtain weighted distances, and wherein said most similar pattern determining means determines one of the plurality of reference patterns as the most similar pattern to the input pattern by determining a shortest distance from the weighted distances.

2. An isolated speech word recognizer as claimed in claim 1, wherein each of the weighted distances is a sum of weighted differences, each of the weighted differences being obtained by multiplying a difference between the input feature parameter and the corresponding reference feature parameter by the weight parameter corresponding thereto.

3. An isolated speech word recognizer as claimed in claim 1, wherein each of the weighted distances is a sum of differences between weighted input feature parameters and weighted reference parameters, each of the weighted input feature parameters being obtained by multiplying the input feature parameter by the weight parameter corresponding thereto, and each of the weighted reference parameters being obtained by multiplying the reference feature parameter by the weight parameter corresponding thereto.

4. An isolated speech word recognizer as claimed in claim 1, wherein the weight patterns are formed from standard deviations of the known patterns.

5. An isolated speech word recognizer as claimed in claim 1, further comprising processing means, operatively connected to said most similar pattern determining means, for conducting a process to determine the most similar pattern.

6. An isolated speech word recognizer as claimed in claim 5, wherein said processing means comprises dial information outputting means for outputting dial information corresponding to the most similar pattern.

7. An isolated speech word recognizer for recognizing an input pattern as one of a plurality of known patterns, comprising:

similarity information storing means for storing similarity information representing the degree of significance of features in each of the known patterns for recognizing the features; and most similar pattern determining means, operatively connected to said similarity information storing means, for determining one of said plurality of known patterns as a most similar pattern to the input pattern by the use of the similarity information, a plurality of input feature parameters and a plurality of reference feature parameters, wherein the similarity information is a plurality of weight patterns respectively corresponding to the plurality of known patterns, each of the weight patterns representing the degree of significance of the features of the known patterns to recognize the most similar pattern, wherein said speech word recognizer further comprises:

feature parameter extracting means, operatively connected to said most similar pattern determining means, for extracting the plurality of input feature parameters from the input pattern; and reference pattern storing means, operatively connected to said most similar pattern determining means, for storing the plurality of reference patterns as the known patterns each having a plurality of reference feature parameters, and wherein the weight pattern of each of the reference patterns having a plurality of weight parameters corresponding to the plurality of reference feature parameters in each of the plurality of reference patterns, each of the weight parameters being smaller than a predetermined value when the corresponding reference feature parameter is significant to recognize the reference pattern corresponding thereto, and being larger than the predetermined value when the corresponding reference feature parameter is not significant to recognize the reference pattern corresponding thereto, and wherein each of the parameters in the input feature parameters, in the reference feature parameters, and in the weight parameters is a function of frequency with respect to time.

8. An isolated speech word recognizer for recognizing an input pattern as one of a plurality of known patterns, comprising:

similarity information storing means for storing similarity information representing the degree of significance of features in each of the known patterns for recognizing the features; and most similar pattern determining means, operatively connected to said similarity information storing means, for determining one of said plurality of known patterns as a most similar pattern to the input pattern by the use of the similarity information, and wherein the similarity information is a plurality of similarity functions respectively corresponding to the plurality of known patterns, each of the similarity functions being obtained as a histogram of a predetermined number of pronunciations of a corresponding known pattern.

9. An isolated speech word recognizer as claimed in claim 8, wherein said speech word recognizer further comprises:

feature parameter extracting means, operatively connected to said most similar pattern determining means, for extracting a plurality of input feature parameters from the input pattern, wherein said similar information storing means includes similarity function group storing means, operatively connected to said most similar pattern determining means, for storing a plurality of similarity function groups, each of the similarity function groups including the plurality of similarity functions each representing a normalized histogram with respect to reference feature parameters corresponding to one of the known patterns, and wherein said most similar pattern determining means calculates similarities between the known patterns and the input pattern by the use of the input feature parameters and the similarity function groups, whereby the known pattern representing the maximum similarity to the input pattern is recognized as the most similar pattern to the input pattern.

10. An isolated speech word recognizer as claimed in claim 8, wherein said feature parameter extracting means comprises:

analog-to-digital converting means for converting an input analog signal corresponding to the input pattern into a digital signal;

a plurality of bandpass filters, operatively connected to said analog-to-digital converting means, for dividing the digital signal into a plurality of frequency channel signals; and speech parameter extracting means, operatively connected to said band pass filters, for extracting speech parameters from the signal components in the frequency channel signals.

11. An isolated speech word recognizer as claimed in claim 8, further comprising processing means, operatively connected to said most similar pattern determining means, for conducting a process to determine the most similar pattern.

12. An isolated speech word recognizer as claimed in claim 8, wherein said processing means comprises dial information outputting means for outputting dial information corresponding to the most similar pattern.

13. An isolated speech word recognizer for recognizing an input pattern as one of a plurality of known patterns, comprising:

similarity information storing means for storing similarity information representing the degree of significance of features in each of the known patterns for recognizing the features; and most similar pattern determining means, operatively connected to said similarity information storing means, for determining one of said plurality of known patterns as a most similar pattern to the input pattern by the use of the similarity information, a plurality of input feature parameters and a plurality of reference feature parameters, wherein the similarity information is a plurality of weight patterns respectively corresponding to the plurality of known patterns, each of the weight patterns representing the degree of significance of the features of the known patterns to recognize the most similar pattern, wherein said speech word recognizer further comprises:

feature parameter extracting means, operatively connected to said most similar pattern determining means, for extracting the plurality of input feature parameters from the input pattern; and reference pattern storing means, operatively connected to said most similar pattern determining means, for storing a plurality of reference patterns as the known patterns each having the plurality of reference feature parameters, and wherein the weight pattern of each of the reference patterns having a plurality of weight parameters corresponding to the plurality of reference feature parameters in each of the plurality of reference patterns, each of the weight parameters being smaller than a predetermined value when the corresponding reference feature parameter is relatively significant to recognize the reference pattern corresponding thereto, and being larger than the predetermined value when the corresponding reference feature parameter is not relatively significant to recognize the reference pattern corresponding thereto, wherein said isolated speech word recognizer further comprises processing means, operatively connected to said most similar pattern determining means, for conducting a process to determine the most similar pattern, and wherein said processing means comprises dial information outputting means for outputting dial information corresponding to the most similar pattern.

14. An isolated speech word recognizer for recognizing an input pattern as one of a plurality of known patterns, comprising:

similarity information storing means for storing similarity information representing the degree of significance of features in each of the known patterns for recognizing thereof; and most similar pattern determining means, operatively connected to said similarity information storing means and preselecting means, for determining one of said plurality of known patterns as a most similar pattern to the input pattern by the use of preselected similarity information including a plurality of preselecting feature patterns, and a plurality of input feature patterns, feature parameter extracting means, operatively connected to said most similar pattern determining means, for extracting the plurality of input feature parameters from the input pattern;

preselecting feature pattern storing means for previously storing a group consisting of a plurality of preselecting feature patterns corresponding to an input speech content;

distance calculating means, operatively connected to said preselecting feature pattern storing means, for calculating distances between the input feature pattern formed from the input speech content and the preselecting feature patterns stored in said preselecting feature pattern storing means;

distance data temporary storing means, operatively connected to said distance calculating means, for temporarily storing the distances calculated by said distance calculating means;

preselecting means, operatively connected to said distance calculating means, for selectively outputting the preselecting feature pattern representing a minimum distance in the distances stored in said distance data temporary storing means; and link data storing means, operatively connected to said preselecting means and said distance data temporary storing means, for previously storing a relation between a feature pattern and a group including the feature pattern, and wherein all the feature patterns in the group having the preselecting feature pattern representing the minimum distance are output from said link data storing means and input to said distance data temporary storing means, whereby, from said distance data temporary storing means, the distances stored therein corresponding to all of the feature patterns in the group having the preselecting feature pattern representing the minimum distance are deleted.

15. An isolated speech word recognizer as claimed in claim 14, wherein said link data storing means comprises:

link data memory means for storing the relation, the relation being the one between a pattern number of the feature pattern and a speech number of the group including the feature pattern;

comparing means, operatively connected to said preselecting means and said link data memory means, for reading, from said link data memory means, at least one speech number corresponding to the pattern number of the preselecting feature pattern output from said preselecting means; and recomparing means, operatively connected to said comparing means, said link data memory means, and said distance data temporary storing means, for reading, from said link data memory means, at least one pattern number corresponding to the speech number output from said comparing means, and wherein, in said distance data temporary storing means, the distance data corresponding to the speech number output from said recomparing means is deleted.

16. An isolated speech word recognizer as claimed in claim 14, wherein said feature parameter extracting means comprises:

analog-to-digital converting means for converting an input analog signal corresponding to the input pattern into a digital signal;

a plurality of bandpass filters, operatively connected to said analog-to-digital converting means, for dividing the digital signal into a plurality of frequency channel signals; and speech parameter extracting means, operatively connected to said band pass filters, for extracting speech parameters from signal components in the frequency channel signals.

17. An isolated speech word recognizer as claimed in claim 14, further comprising processing means, operatively connected to said most similar pattern determining means, for conducting a process to determine the most similar pattern.

18. An isolated speech word recognizer as claimed in claim 14, wherein said processing means comprises dial information outputting means for outputting dial information corresponding to the most similar pattern.

* * * * *

UNITED STATES PATENT AND TRADEMARK OFFICE
CERTIFICATE OF CORRECTION

PATENT NO. : 5,159,637
DATED : October 27, 1992
INVENTOR(S) : Makoto OZAZAKI et al.

It is certified that error appears in the above-identified patent and that said Letters Patent is hereby corrected as shown below:

Column 1, line 52, change "33852" to --333852--.

Column 6, line 24, change "70" to --7--;

line 59, delete "pattern";

line 60, after "input" (first occurrence) insert --pattern--.

Column 7, line 64, change "($P_i$)" to --$P_{in}$--.

Column 8, line 40, change "$Wk_{kn}$" to --$W_{kn}$--.

Column 9, last line (equation) after "96" insert --.-- (a period).

Column 12, line 40, change "diagram" to to --diagrams--.

UNITED STATES PATENT AND TRADEMARK OFFICE
CERTIFICATE OF CORRECTION

PATENT NO. : 5,159,637
DATED : October 27, 1992
INVENTOR(S) : Makoto Ozazaki, et al.

It is certified that error appears in the above-indentified patent and that said Letters Patent is hereby corrected as shown below:

Column 14, line 17, change "frams" to --frames--.

Signed and Sealed this

Ninth Day of November, 1993

Attest:

BRUCE LEHMAN

*Attesting Officer*     *Commissioner of Patents and Trademarks*